United States Patent [19]

Murphy et al.

[11] Patent Number: 5,237,559
[45] Date of Patent: Aug. 17, 1993

[54] REPRODUCTION OF SOUND TRACK SIGNALS BY VARYING THE DETECTOR THRESHOLD LEVEL AS A FUNCTION OF THE TRANSVERSE SCAN POSITION

[75] Inventors: James B. Murphy, Fairfax; Martin J. Richards, Redwood City, both of Calif.

[73] Assignee: Dolby Laboratories Licensing Corporation, San Francisco, Calif.

[21] Appl. No.: 756,187

[22] Filed: Sep. 5, 1991

[51] Int. Cl.⁵ ............................................... G11B 7/20
[52] U.S. Cl. ....................................... 369/125; 369/124
[58] Field of Search ............... 369/100, 120, 124, 125; 352/26-28

[56] References Cited

U.S. PATENT DOCUMENTS

| | | | |
|---|---|---|---|
| 2,347,084 | 4/1944 | Cooney | 369/121 |
| 2,485,829 | 10/1949 | Holst et al. | 369/121 |
| 2,575,445 | 11/1951 | Germer | 250/201.1 |
| 2,615,991 | 10/1952 | Hansell | 369/107 |
| 4,124,784 | 11/1978 | Johnson et al. | 369/89 |
| 4,223,188 | 9/1980 | Dolby | 369/121 |
| 4,338,684 | 7/1982 | Dolby | 369/92 |
| 4,355,383 | 10/1982 | Dolby | 369/120 |
| 4,577,302 | 3/1986 | Allen | 369/44.11 |

OTHER PUBLICATIONS

Allen, I. "The Production of Wide-Range, Low Distribution Optical Sound Tracks Utilizing the Dolby Noise Reduction System," *SMPTE Journal*, Sep. 1975, vol. 84, pp. 720-729.

Mosely, J. et al., "The Colortek Optical Stereophonic Sound Film Sytem," *SMPTE Journal*, vol. 87, pp. 222-232.

*Primary Examiner*—Paul M. Dzierzynski
*Assistant Examiner*—Jim Beyer
*Attorney, Agent, or Firm*—Thomas A. Gallagher; David N. Lathrop

[57] ABSTRACT

Audio information is recovered from a variable-area optical record, particularly motion picture film variable-area optical soundtracks. A scan signal is obtained by repetitively scanning the optical record substantially transverse to the bias line. The noise reduction effect is enhanced by a threshold detector which is provided with a transversely varying threshold level that varies according to the position of the scan across the width of the soundtrack. A threshold is provided for a bilateral soundtrack, the threshold having a minimum level at the bias line of the soundtrack and increasing progressively with distance from the bias line. Thus, one each scan, the threshold level is high when the scan is at the edge of each soundtrack, falls progressively to a minimum when the scan reaches the bias line, and then increases progressively back to its original high level when the scan is at the other edge of the soundtrack.

54 Claims, 14 Drawing Sheets

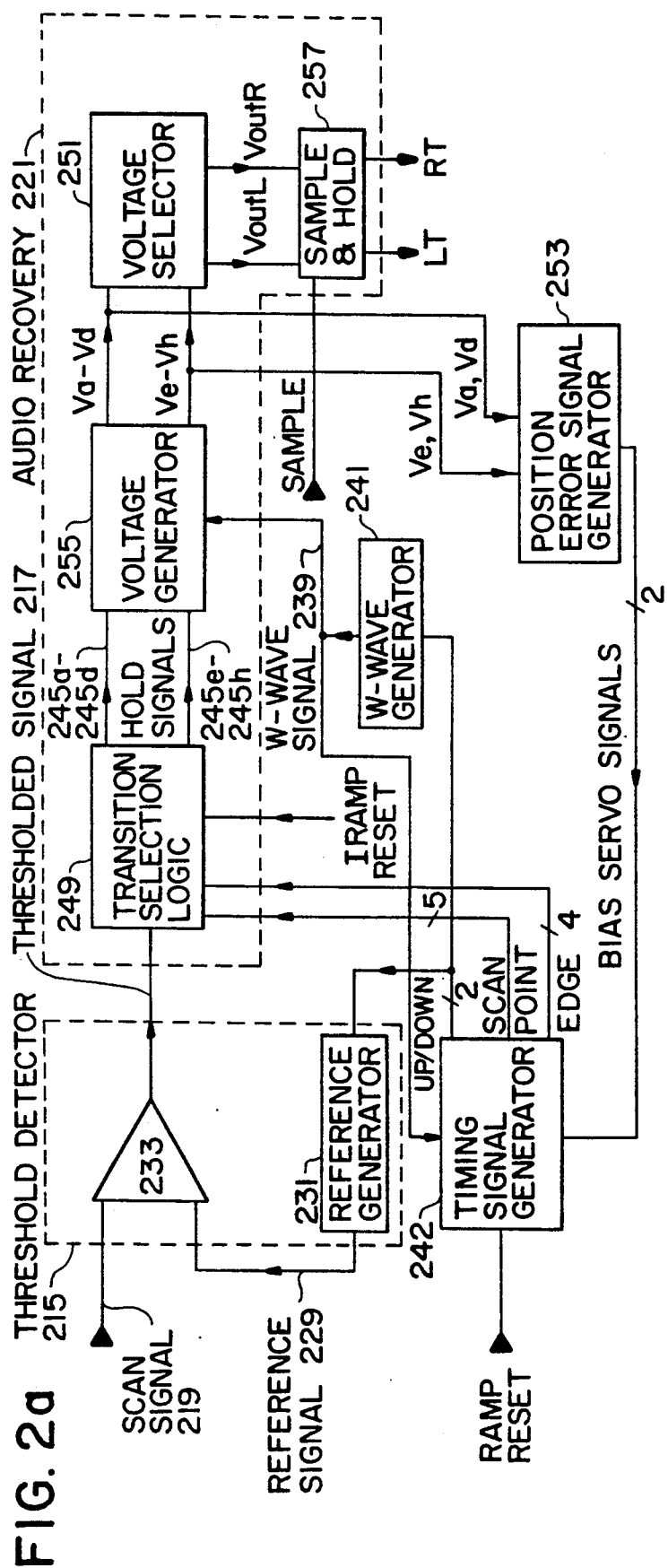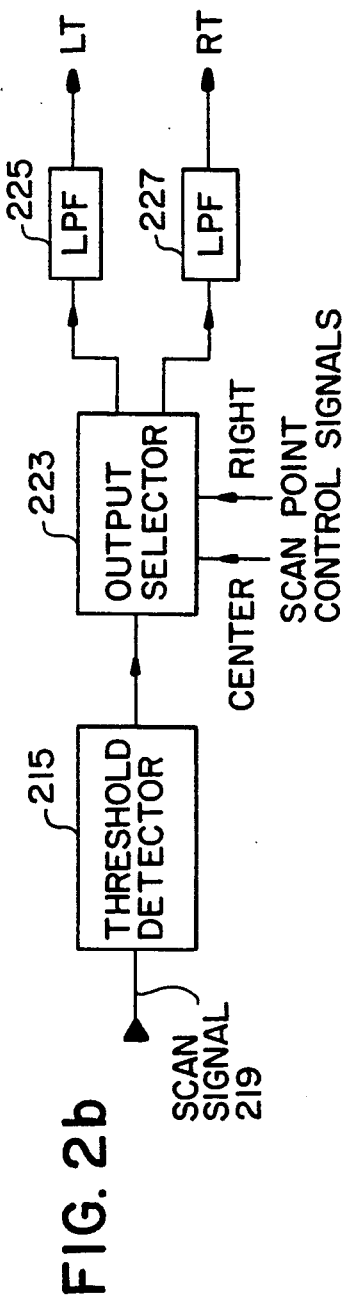
FIG. 2a
FIG. 2b

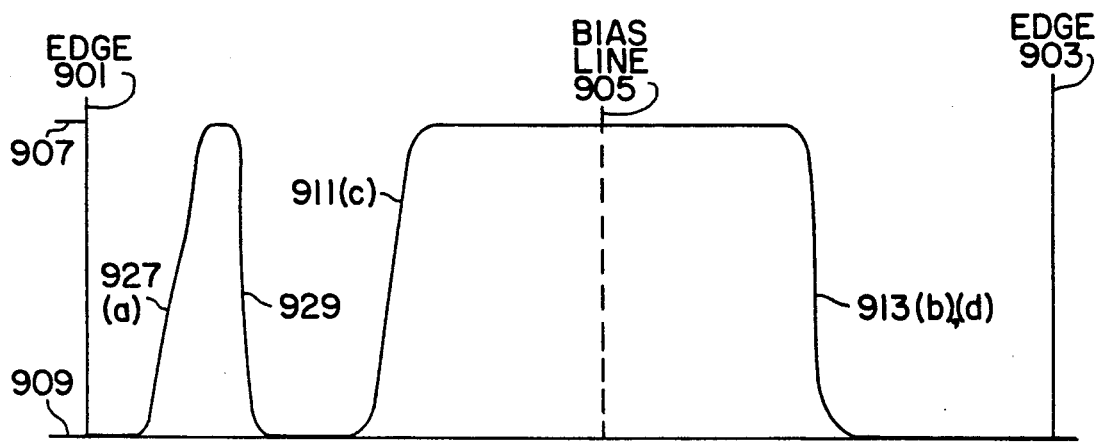
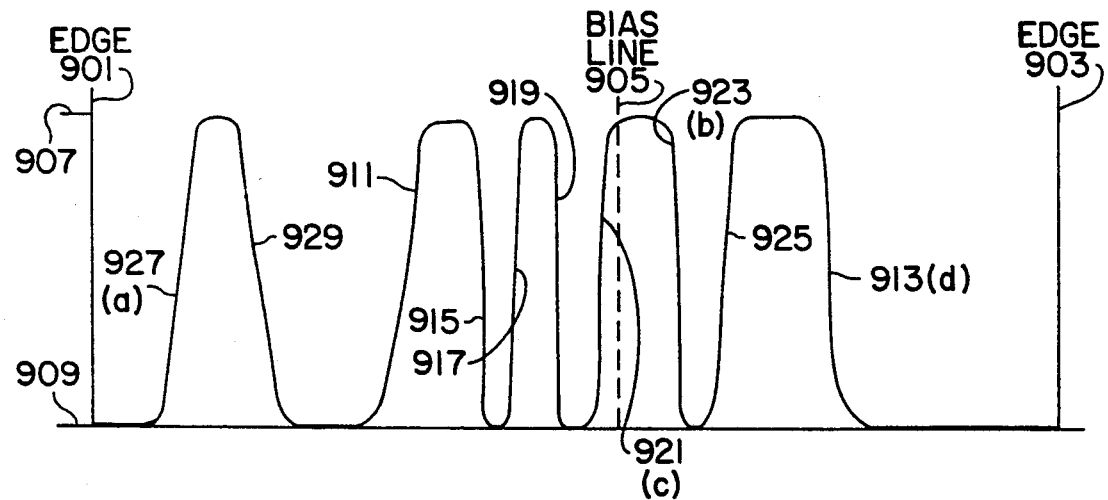
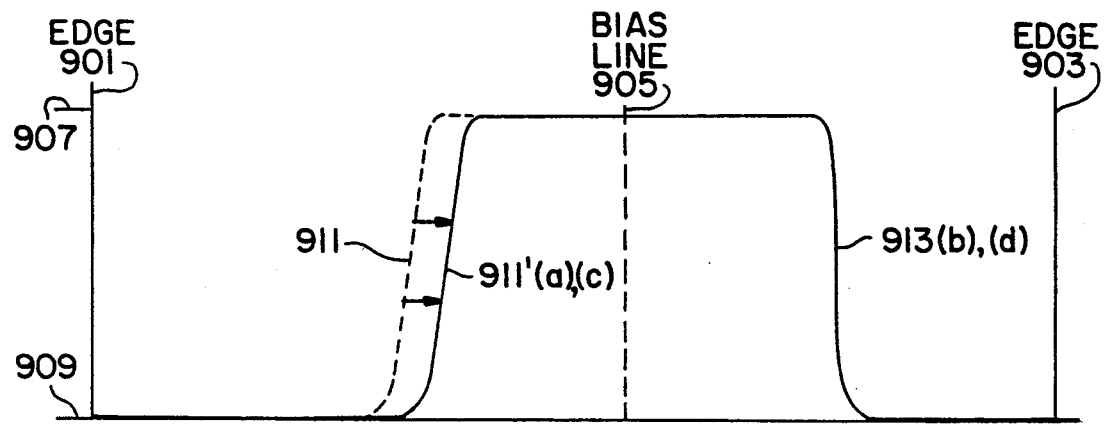

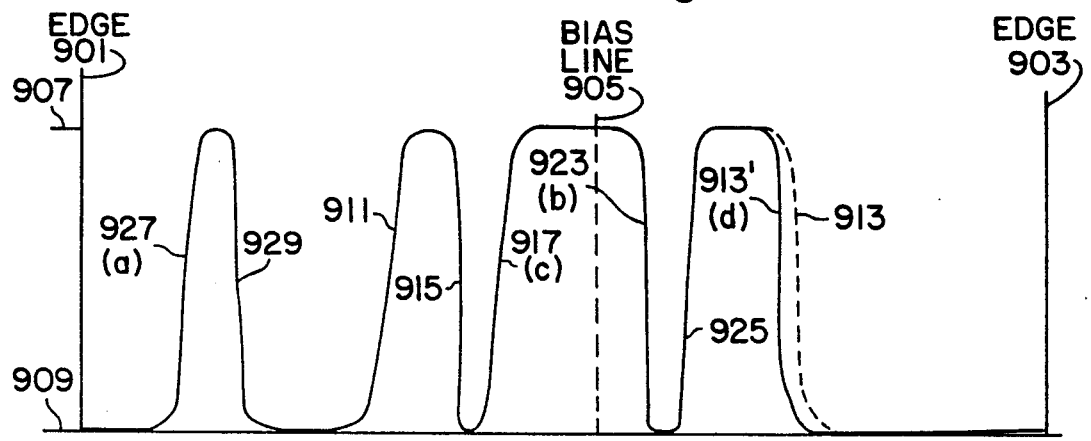
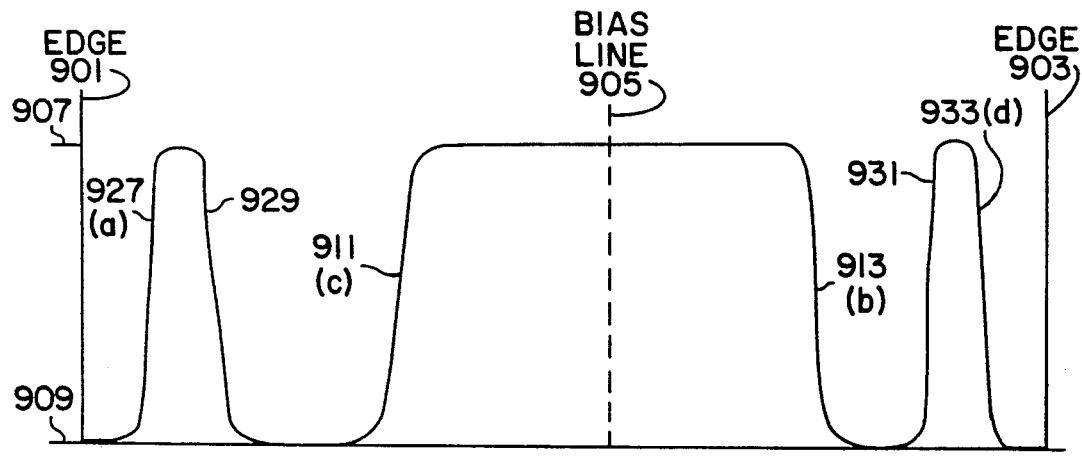

REPRODUCTION OF SOUND TRACK SIGNALS BY VARYING THE DETECTOR THRESHOLD LEVEL AS A FUNCTION OF THE TRANSVERSE SCAN POSITION

BACKGROUND OF THE INVENTION

The invention relates generally to the recovery of an audio information signal from a variable-area optical record and more particularly to the recovery of such a signal from motion picture film variable-area optical soundtracks.

Variable-area optical soundtracks on motion picture film have been used in substantially their present form since the earliest days of sound-on-film in the cinema. In their earliest form, a single monophonic optical soundtrack was used, the width of the clear area being proportional to the recorded modulation amplitude. Later modifications intended to reduce distortion provided for bilateral and dual bilateral tracks adjacent to each other, carrying the same modulation information and being identical in their pattern. A further modification provides for separately modulating each of the dual bilateral tracks to provide stereophonic reproduction.

Modern commercial film projectors continue to use essentially the same illumination and light sensing arrangements for reading variable-area optical soundtracks as those that were used in the earliest sound projection equipment: a light source and narrow mechanical slit to provide a line source illumination, with a single photocell for detection or with dual photocells in the case of stereophonic dual bilateral tracks. Silicon solar cells have replaced the vacuum tube photocells originally used.

Various techniques introduced since the early 1970s and now in use to improve the quality of optical soundtracks show that the medium is not inherently as deficient as had been supposed in the 1950s and 1960s, when attempts were made to popularize magnetic soundtracks. A useful discussion of the history and potential of optical soundtracks can be found in *The Production of Wide-Range, Low-Distortion Optical Sound Tracks Utilizing the Dolby Noise Reduction System*, by Ioan Allen in THE JOURNAL OF THE SMPTE, September 1975, Volume 84, pages 720–729. The paper includes a bibliography in the subject area.

A continuing problem in optical soundtrack reproduction is that of achieving a low noise level while providing a wide frequency range. The electrical output level of a solar cell or photocell depends not only on the width of the clear area of the soundtrack but also on the transmissivity of the both the clear and the opaque areas of the soundtrack. Variations in the transmissivity of the clear and opaque areas of the soundtrack are reproduced as noise, transmissivity variations in the clear area being the predominant contributor. The transmissivity of the clear area of the soundtrack is reduced by dirt and scratches; the transmissivity of the opaque area of the soundtrack is increased by pinholes and scratches. The incidence of these transmissivity variations, and hence of print noise, is relatively low in a fresh print, but increases with the number of times a print is projected.

In recent years, improved techniques have reduced other sources of soundtrack noise. On the other hand, the near demise of the projectionist and the increasingly common use of continuous-play platters has increased the rate at which a print wears, and print noise increases, with the number of times the print has been projected. This has meant that print noise has become a problem in first-run motion picture theaters; and that such noise is now the predominant source of noise in motion picture sound systems. Print noise is also less acceptable in second-run theaters, many of which have now installed improved sound systems. The audio noise reduction that is standard in improved motion picture theater sound systems does not deal with the impulsive nature of print noise very effectively.

There have been many prior attempts to eliminate print noise in optical soundtrack reproduction. Many of these prior attempts try to measure the width of the clear area of the soundtrack independently of the transmissivity of the opaque and clear areas of the soundtrack. One early attempt was described in 1944 in U.S. Pat. No. 2,347,084 of Cooney in which the optical soundtrack was repeatedly scanned across its width by a very small spot of light and the light transmitted through the soundtrack was detected by a single photo cell. The output signal from the photo cell was limited to produce an essentially two-level pulse width modulated signal and to reduce the noise caused by clear area transmissivity variations. The pulse-width modulated signal was then integrated to recover the audio signal. This arrangement reduced noise caused by transmissivity variations in the clear area of the soundtrack at the expense of increasing the possibility of transmissivity variations in the opaque areas of the soundtrack causing noise. This was a reasonable trade-off, however, because transmissivity variations in the opaque area are less likely to occur than transmissivity variations in the clear area. A limiter had the additional shortcoming that it could not prevent large variations in the transmissivity of the clear area, such as large specks of dust and scratches, from contributing noise to the output signal.

Cooney also suggested that the image of an illuminated slit could be focussed on the soundtrack in the conventional way and that the resulting illuminated area of the soundtrack could be scanned by a television camera-like scanning device.

U.S. Pat. No. 2,485,829 of Holst et al. shows a scanning arrangement using a threshold detector instead of a limiter to reduce noise caused by transmissivity variations. When the output of the photo cell was below a threshold level, the output of the threshold detector was held in one constant voltage state (e.g., at a low voltage), and when the output of the photo cell was above the threshold level, the output of the threshold detector was held in a different constant voltage state (e.g., at a high voltage). The threshold detector reduced noise because minor transmissivity changes in either the opaque area or the clear area would not change the photo cell output sufficiently to cross the threshold and cause noise generating transitions in the output of the threshold detector. However, large transmissivity variations, such as large specks of dust, scratches, and pinholes, could still contribute noise to the output signal.

In U.S. Pat. No. 4,223,188 of Ray M. Dolby, noise caused by clear area transmissivity variations in the output of a scanned optical soundtrack playback system was reduced by using transitions in the output of the photo cell to trigger a bistable circuit. The bistable circuit started the scan in one state, and was triggered into its other state by the first transition in the output of the photocell caused by an opaque-to-clear boundary in the soundtrack. The bistable circuit was reset to its initial state at a fixed point later in the scan, e.g., at the end of the scan. The audio signal was recovered by integrating the output of the bistable circuit. A development enabled both boundaries of a bilateral soundtrack to contribute to the recovered audio signal by using a transition in the photocell output caused by a clear-to-opaque boundary in the soundtrack to reset the bistable circuit. To reduce the possibility of dirt in the clear area from falsely resetting the bistable, only a clear-to-opaque transition after which the output of the photo cell remained in its "opaque" state for more than a given amount of time, typically 1% to 5% of the scan period, was allowed to reset the bistable circuit. This arrangement was unable to reduce noise caused by transmissivity variations in the opaque area and by contamination of the opaque to clear and clear to opaque boundary regions.

Cooney's scanning system using a television camera detector was combined with the threshold detector of Holst et al. in U.S. Pat. No. 4,124,784 of Johnson et al. Instead of a television camera, Johnson et al. used a 256 element charge-coupled device (CCD) array on to which a magnified image of the slit-illuminated soundtrack was projected. The output of the CCD array was fed into a threshold detector as already described. The threshold detector reduced noise due to transmissivity variations, but variations in the opaque-to-clear and clear-to-opaque boundary regions, and large variations in the transmissivity of both the opaque and clear areas could still contribute noise to the output signal.

All of the scanning devices described above, and other scanning devices not described, although giving improved noise performance compared with a solar cell, suffer from two significant defects: distortion and noise. The inability of simple limiters and threshold detectors to reduce noise due to large transmissivity errors has already been described. Scanning systems also suffer from high distortion because the opaque-to-clear and clear-to-opaque boundaries of the soundtrack are not infinitely sharp; instead, the transmissivity of the soundtrack changes from opaque to clear over a distance of about 200$\mu$" (5 microns), which is significant even compared with the maximum peak-to-peak amplitude of a unilateral track of about 16 mil. (400 $\mu$m), and more significant compared with lower modulation amplitudes.

When the soundtrack is applied to the film, exposure and development parameters which determine the width and shape of the boundary region are chosen so as to minimize distortion when the soundtrack is reproduced by a solar cell. The electrical output of the solar cell represents the total light flux reaching the cell as a result of transmission through the opaque area (negligible), the opaque-to-clear boundary region, the clear-to-opaque boundary region, and the clear area. The proportional contribution of the two boundary regions to the total light flux is different at each point on the cycle of the waveform. It is also frequency dependent: at short wavelengths, the opaque areas between successive cycles tend to grow together across the narrow clear area between them, thus widening the boundary regions.

Known scanning systems employing limiters or threshold detectors to reduce noise produce on each scan an output that is proportional to the effective width of the clear area of the soundtrack at the point at which it is scanned. Because the two boundary regions each have finite width, the measured effective width of the clear area (a) depends on the choice of threshold level or limiting level, (b) is different at different points on the cycle of the waveform, and (c) is frequency dependent. Consequently, a fixed threshold level or limiting level can be chosen that gives low distortion at a given frequency and amplitude, but that fixed threshold level will give significant distortion at other frequencies and levels.

A particularly severe form of distortion afflicts the negative peaks of the recorded waveform. On negative peaks, the clear area is so narrow that the two boundary regions of the soundtrack overlap and the clear area becomes partially opaque. This effect is exacerbated by the tendency of opaque areas to grow together when the clear area between them is narrow. Thus, the soundtrack has no area that a scanning system with a fixed threshold or with limiting would interpret as being clear. This results in clipped negative peaks in the audio output of the scanning system. Because the width of the bias line (the bias line is the nominally clear area that always exists between the two halves of a bilateral track) is varied according to the amplitude of the waveform recorded on the soundtrack to minimize the amount of clear area in the soundtrack, negative peak clipping can occur with signals of all levels.

SUMMARY OF THE INVENTION

The invention relates to the recovery of an audio information signal from a variable-area optical record having record indicia disposed substantially symmetrically about a bias line, particularly bilateral optical soundtracks carried on motion picture film. The invention, in its various aspects, operates in an environment in which a scan signal is obtained by repetitively scanning the optical record, substantially transverse to the bias line.

Such scanning may be performed in any manner, including, for example, by physical motion or by electrical or optical action, or any combination thereof. Scanning may also be performed, at least in part, by computational operations (such as by digital signal processing techniques).

Many commonly-used scanning arrangements use a radiation source and one or more radiation receptors or sensors. Such arrangements include those in which the radiation source provides the scanning action, the receptors provide the scanning action, the record carrier provides the scanning action and those in which a combination of radiation source, receptor and/or record carrier activity provides the scanning action. Examples of systems in which the radiation source provides some or all of the scanning action and the receptors provide no scanning action include those having a flying-spot scanner or a deflected beam of light or other radiation for illuminating the record carrier. Further scanning action may be provided by movement of the record carrier. An example of a system in which the receptor activity provides some or all of the scanning action and the radiation source provides no scanning action is that in which a source of radiation illuminates the full width of the record carrier, and a scanned sensor, such as an electrically sampled charge-coupled device (CCD) provides the scanning action. In such an arrangement, further scanning action also may be provided by movement of the record carrier.

As mentioned above, scanning may also be performed at least in part by computational operations (such as by digital signal processing techniques). An example is an arrangement in which a digitally encoded image representation of the record carrier is obtained by using one of the aforementioned arrangements to derive an analog video-like image and then converting the analog image to digitally encoded form. The image representation is then scanned in the digital domain using digital signal processing techniques.

The output of the scanning arrangement is a scan signal from which, after processing according to the invention, at least one analog audio signal is recovered. The processing according to the invention may be implemented by the circuitry of the preferred embodiments or by any equivalent thereof, including digital signal processing. Thus, if a digitally encoded image of the record carrier is derived, both the scanning action and the processing action may be done computationally by digital signal processing techniques.

The invention enhances the noise reduction effect obtainable using a threshold detector to recover an audio signal from a scan signal by providing the threshold detector with a transversely varying threshold level that varies according to the position of the scan across the width of the bilateral soundtrack. According to the invention, a threshold is provided that has a minimum level at the bias line of the bilateral soundtrack (or at the bias line of each bilateral soundtrack if there is more than one bilateral soundtrack, as in the case in a dual bilateral soundtrack), and that increases progressively with distance from the bias line. Thus, on each scan, the threshold level is high when the scan is at the edge of each soundtrack, falls progressively to a minimum when the scan reaches the bias line, and then increases progressively back to its original high level when the scan is at the other edge of the soundtrack. With a normal dual bilateral soundtrack, the threshold level falls and rises twice per scan, once on each bilateral soundtrack.

The threshold may vary linearly with distance from the bias line of each bilateral soundtrack, but a parabolic law is preferred. In both cases, the maximum threshold level can be at between 80% and 110% of the scan signal, 100% being preferred, and the minimum threshold level can be at between 5% and −5% of the scan signal, 0% being preferred, where 0% is the black level of the scan signal and 100% is the peak level of the scan signal.

The transversely varying threshold level of the invention reduces noise due to transmissivity variations in both the clear and opaque areas of the soundtrack by a greater amount than a fixed threshold level by ensuring that, at each point on the scan of the soundtrack, there is a maximum difference between the threshold level and the normal level of the scan signal at that point on the scan of the soundtrack. This way, the change in the level of the scan signal required to cross the threshold is maximized at all points on the scan of the soundtrack, and the chance that a change in the level of the scan signal caused by a transmissivity variation will be sufficient to cross the threshold is minimized. For instance, the threshold is high near the edges of the soundtrack, where the film is normally opaque, the level of the scan signal is normally low, and pinholes causing the level of the scan signal to increase are the main form of transmissivity error. The high threshold requires that the pinhole be comparatively large for it to be able to transmit enough light to increase the level of the scan signal above the threshold level. The threshold is low in the middle of the soundtrack where the film is normally clear, the level of the scan signal is high, and dirt and scratches causing the level of the scan signal to decrease are the main form of transmissivity error. The low threshold requires that the piece of dirt or the scratch be comparatively large for it to be able to attenuate the light sufficiently to reduce the level of the scan signal below the threshold level.

A further benefit of a threshold detector with a transversely varying threshold level according to the invention is that it considerably reduces distortion, especially at high frequencies, and eliminates clipping of the negative peaks of the analog audio signal recovered from the soundtrack. A low threshold level near the bias line enables the clear area to be detected, even when the clear area is very narrow and partially opaque.

The invention also includes circuitry for generating a transversely varying threshold level having minima that accurately track the bias lines of both bilateral soundtracks and is tolerant of film weave and differences in the magnification of the scanner optical system.

A further aspect of the invention recovers the audio signal from the output of the threshold detector in a way that suppresses noise that would otherwise be generated by transmissivity errors that are sufficiently large to cross the threshold of the threshold detector. This aspect of the invention is preferably used in combination with the threshold detector having a transversely varying threshold level as described above, but it can also be used with a conventional fixed threshold level threshold detector. On each scan, on each bilateral soundtrack, one or more transitions representing the true width of the clear area of the soundtrack at the point at which it is scanned are selected from the possibly many transitions occurring in the output of the threshold detector during the course of the scan. The analog output signal is then derived from the one or more selected transitions.

A two-step process is used to select the one or more transitions representing the true width of the clear area of the soundtrack. First, the following transitions are selected:

transition (a): the opaque-to-clear transition farthest from the bias line before the scan passes the bias line,
transition (b): the clear-to-opaque transition closest to the bias line after the scan has passed the bias line,
transition (c): the opaque-to-clear transition closest to the bias line before the scan passes the bias line, and
transition (d): the clear-to-opaque transition farthest from the bias line after the scan has passed the bias line.

In the second selection step, one or more of the four transitions selected in the first step is selected as the output transition $W_{out}$ having a distance (z) from the bias line according to the following rules:

distance(z) is the lesser of {distance(x)} and {distance (y)} where:
distance (x) is the greater of the distances from the bias line to transition (a) and to transition (b), and
distance (y) is the greater of the distances from the bias line to transition (c) and to transition (d).
But if:
distance (x) substantially equals distance (y) then distance (z) is the average of distance (x) and distance (y);

the distances from the bias line to transition (a) and to transition (b) are substantially equal, then distance (x) is the average of the distances from the bias line to the transition (a) and to transition (b);

the distances from the bias line to transition (c) and to transition (d) are substantially equal, distance (y) is the average of the distances from the bias line to the transition (c) and to transition (d).

From transition $W_{out}$ there is generated an analog voltage $V_{out}$ that accurately represents the effective width of the clear area of the soundtrack at the point at which it is scanned, despite the presence of large transmissivity variations in either the opaque area, the clear area or the boundary regions between the opaque and clear areas of the soundtrack.

In the preferred embodiment, the second transition selection step is carried out in the voltage domain and the analog output voltage $V_{out}$ is selected directly from voltages representing the distances of the four transitions selected in the first transition selection step from the bias line. On each scan, four voltages, $V_a$, $V_b$, $V_c$, and $V_d$ are generated, each of which is proportional to the distance of one of the four transitions (a) through (d) respectively from the bias line. The four voltages are fed into a voltage selector circuit that performs the following logical operation to select directly an analog output voltage $V_{out}$ that is proportional to the effective width of the clear area at the point at which the soundtrack is scanned:

$V_{out}$ is the lesser of $V_x$ and $V_y$ where:

$V_x$ is the greater of $V_a$ and $V_b$, and $V_y$ is the greater of $V_c$ and $V_d$.

But if:

$V_x$ substantially equals $V_y$, $V_{out}$ is the average of $V_x$ and $V_y$;

$V_a$ substantially equals $V_b$, $V_x$ is the average of $V_a$ and $V_b$; and $V_c$ substantially equals $V_d$, $V_y$ is the average of $V_c$ and $V_d$.

In a final distortion-reducing aspect of the invention, a slightly non-linear relationship between voltage and distance from the bias line is used to generate the four voltages $V_a$ through $V_d$. The slope of the voltage-distance curve near the bias line is steeper than at the edges of the soundtrack. This increases the voltages generated from transitions that occur close to the bias line to compensate for the tendency of the opaque areas of the soundtrack to grow together when the clear area is narrow. In the preferred embodiment, the slope of the voltage-distance curve is about 5% steeper near the bias line than near the edges of the soundtrack.

BRIEF DESCRIPTION OF THE DRAWINGS

FIG. 2a shows a simplified block diagram of a scan signal decoder according to the invention.

FIG. 2b shows a block diagram of a simplified version of the scan signal decoder embodying only the threshold detector with a transversely varying threshold aspect of the invention.

FIGS. 9a through 9h show eight examples of how the primary and secondary transition selection stages of the audio recovery circuit according to the invention reduces noise caused by severe transmissivity errors in the soundtrack.

DETAILED DESCRIPTION OF THE INVENTION

Figure 1:
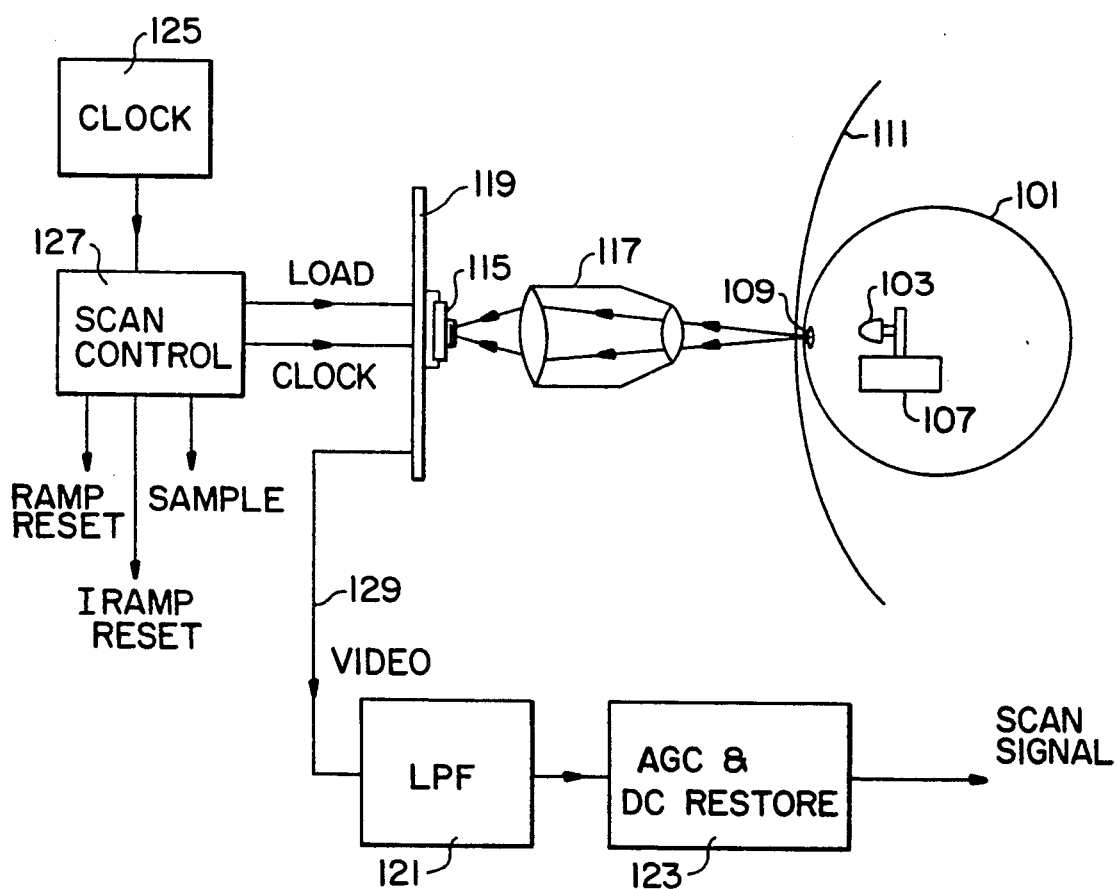
FIG. 1 shows a cross section of the mechanical arrangement of the installation in the optical sound head of a typical projector and a block diagram of the associated electrical circuitry required to generate the scan signal that is decoded by the scan signal decoder circuit of the invention.

FIG. 0 shows a piece of 35 mm motion picture film having a dual bilateral variable-area optical soundtrack. The dual bilateral soundtrack 001 is located on the film between the sprocket holes, one of which is shown as 003, and picture area 005. The dual bilateral soundtrack comprises a first bilateral soundtrack 007 and a second bilateral soundtrack 009 separated by clear septum 011. In a monophonic application (not shown), the two bilateral soundtracks are modulated with the same signal and one audio signal is recovered when the film is played. In a stereophonic application, the right total audio signal is modulated on first bilateral soundtrack 007, and the left total audio signal is modulated on the second bilateral soundtrack 009, and left total and right total audio signals, $R_T$ and $L_T$, are recovered when the film is played. For simplicity, first bilateral soundtrack 007 will be called the "right track" and second bilateral soundtrack 009 will be called the "left track" ("right" and "left" refer to the respective audio signals modulated on the tracks rather than the location of the tracks on the film).

Each bilateral soundtrack comprises a clear area (013 and 015 for the right and left tracks respectively), bounded by two opaque areas (017 and 019, and 021 and 023 for the right and left tracks respectively)—opaque area 017 of the right track merges with opaque surround 025 of picture area 005. A bilateral soundtrack is called bilateral because the width of its clear area (013 and 015 for the right and left tracks respectively) varies symmetrically about the center line of the soundtrack. The center line of the soundtrack (shown as broken lines 027 and 029 for the right and left tracks respectively) is called the bias line of the soundtrack. In normal operation, the bias line of the soundtrack never goes completely opaque.

Between clear area 013 and opaque areas 017 and 019 of the right track lie opaque-to-clear boundary region 031 and clear-to-opaque boundary region 033. In boundary regions 031 and 033, the transmissivity changes progressively from opaque to clear or vice versa over a distance of about 200 $\mu''$ (5 microns). Scanned optical reproduction systems attempt to measure the effective width of clear area 013 (from which width information the audio signal is recovered) by determining which of possibly several opaque-to-clear and clear-to-opaque boundaries detected during a scan of the soundtrack are the true boundary regions 031 and 033 of the soundtrack, and which are unwanted boundaries caused by defects in the soundtrack. The left track has opaque-to-clear boundary region 035 and clear-to-opaque boundary region 037.

The following description will relate to reproducing a dual bilateral soundtrack, unless the text states otherwise. Adaptation of the teachings of this application to a single bilateral soundtrack should be apparent to one of ordinary skill in the art, and so will not be described.

FIG. 1 shows a cross section of the mechanical arrangement of a scanning system in the optical sound head of a typical projector and a block diagram of the associated electrical circuitry required to generate the scan signal that is decoded by the scan signal decoder circuit of the invention. The soundtrack is scanned by a linear CCD array 115. At present, it is not possible simply to substitute the CCD array for the conventional solar cell because 512 element CCD arrays with acceptable performance are considerably longer than the effective width of the standard dual bilateral soundtrack (the standard soundtrack width is 0.076" (1.9 mm), to which must be added about 0.010" (0.25 mm) to allow for track misplacement). Thus, the illuminated part of the soundtrack must be enlarged before it is focussed on CCD array 115. Although it might be possible to fit a CCD array, CCD array head-end electronics, and optical assembly inside sound drum 101, it is simpler and more practical to reverse the light path in the optical sound system, and fit compact radiation source 103 on a suitable bracket 107 inside sound drum 101. Compared with the conventional lamp and slit arrangement, this arrangement illuminates a relatively large area 109 on the soundtrack of film 111. In the preferred embodiment, an infrared LED emitting at 880 nanometers was used for radiation source 103.

CCD array 115 is placed in the position formerly occupied by the exciter lamp of the conventional optical sound system and magnifying optical system 117 is substituted for the slit and lens assembly of the conventional system. CCD array 115 comprises a linear array of 512 pixels, each 14 microns (550$\mu''$) square. In the preferred embodiment, a Dalsa IL-C3-0512B CCD array is used. A similar device, the Dalsa Inc. model IL-C2-0512 is described in "Ultra High Speed CCD Image Sensors for Scanning Applications" by Brian C. Doody et al, *Proceedings of the SPIE-The International Society for Optical Engineering*, vol. 1107, pp. 105–116.

The linear arrangement of the pixels in CCD array 115 serves as the equivalent of the slit of the conventional arrangement. Magnifying optical system 117 uses known techniques to focus an image of illuminated soundtrack area 109 approximately two times normal size on CCD array 115. The required magnification depends on the length of the CCD array: the magnification and positioning of the magnified soundtrack image on the CCD array should be such that the image of the soundtrack symmetrically covers about 80% of the CCD array's pixels.

Scanner electronics 119 for the CCD array receives CLOCK and LOAD signals from scan control circuit 127 (to be described in detail below). The circuitry of scanning electronics 119 is conventional and will not be described here. Suitable information can be found in the CCD Handbook published by Dalsa, Inc., Waterloo, Canada. It is preferable that, to minimize the emission of radio-frequency interference, scanner electronics 119 be mounted in the sound head in close proximity to CCD array 115.

As disclosed in U.S. Pat. applications Ser. Nos. 07/650,571 (Seagrave et al) and 07/710,174 (Seagrave et al), elements corresponding to CCD array 115, optical system 117 and associated devices may be configured and dimensioned so that one CCD array is imaged by not only the analog bilateral soundtrack but also digital soundtrack information carried optically between the sprocket holes of the motion picture film. A linear CCD array having more than 512 elements would likely be required. As disclosed in the Seagrave et al applications, the linear CCD array is used in combination with motion picture film movement to derive a digitally encoded image of both the analog and digital soundtrack information. Both the underlying analog and digital information may then be recovered computationally from the digitally encoded image. The said Seagrave et al applications are incorporated herein in their entirety.

Clock 125 which, in the preferred embodiment, runs at 27 MHz, provides clock signals for scan control circuit 127. Scan control circuit 127 divides down the output of clock 125 to obtain the basic scanning rate for CCD array 115 and provide synchronization signals for the scan decoder circuit that is the subject of the invention and that will be described in detail below. Scanning rates in the range of 30–100 kHz can be used for CCD array 115, depending on the bandwidth and freedom from aliasing required. In the preferred embodiment, a scanning rate of about 48 kHz is used. The 27 MHz clock rate is divided by 560, giving a scanning rate of 48.214 kHz. The division ratio of 560 provides a sequence of 512 clock cycles to clock out the 512 elements of CCD array 115, 32 clock cycles for sampling, during which time the SAMPLE control signal is high, and 16 clock cycles for system reset, during which time the RAMP RESET control signal and its inverse, the IRAMP RESET control signal, are high and low respectively. The LOAD control signal goes high for the duration of the 560th clock cycle and resets CCD array 115 for a new scan.

The preferred scanning rate of about 48 kHz is somewhat higher than the Nyquist rate required for a 20 kHz bandwidth, but the higher scanning frequency is desirable to reduce aliasing caused by components at frequencies higher than 20 kHz present on soundtracks recorded on modern optical recorders. Optical soundtracks are not normally recorded with frequencies greater than 20 kHz, but distortion of the recorded image can create harmonics on the film at higher frequencies. Mechanical and optical limitations in the recorder, film, and reproducer mean that the amplitude of reproduced supersonic frequencies is relatively low, and falls rapidly with increasing frequency: a scanning rate of about 48 kHz has been found to deal with the aliasing problem adequately.

The output 129 of CCD array 115 is a video signal comprising a series of pulses at the frequency of the CLOCK signal (27 MHz in the preferred embodiment), each pulse being an analog signal having about 50–60 dB dynamic range and representing the integral of the illumination that fell on the pixel represented by the pulse during the time between scans (i.e., over about 20.7 µs in the preferred embodiment).

Using 512 pixels to scan the complete dual bilateral soundtrack does not give sufficient spatial resolution to produce a digital representation of the widths of the clear areas of the soundtrack as accurately as is required for high quality reproduction. However, the desired degree of spatial resolution can be obtained by using the analog content of the output of each pixel. This is done by passing CCD array output 129 through low-pass filter 121 which reconstructs the analog video waveform that would have resulted from a continuous measurement of the transmissivity of the soundtrack across the width of the soundtrack.

Filter 121 essentially interpolates the transmissivity of the soundtrack at points other than at the center of each of the pixels. Because the soundtrack does not have infinitely sharp boundaries between its opaque areas and its clear areas, the filter can accurately recover all of the information on the soundtrack. The soundtrack boundaries each cover almost three pixels, which results in a spatial oversampling analogous to the frequency oversampling that is required in a time domain sampled system of finite bandwidth to recover all the information in the signal being sampled. Nyquist considerations indicate that fewer pixels could successfully recover all the information in a dual bilateral soundtrack, but the resolution of the next smaller array, which has 256 pixels, is insufficient. Filter 121 is a third-order low-pass filter with a corner frequency of about 24 kHz. Such filters are well known and so will not be discussed further. Filter 121 also removes clock frequency components from the output of CCD array 115.

The output of filter 121 is connected to the input of AGC and DC restore circuit 123, which applies DC restoration to the video signal at the output of filter 121 so that zero illumination (i.e., the illumination of the CCD array pixels produced by the radiation source 103 (FIG. 1) illuminating the opaque area of the soundtrack) is represented by signal level of zero volts. A different output voltage for zero illumination can be selected if desired. AGC and DC restore circuit 123 also normalizes the amplitude of the video signal by the sampling peak amplitude of the video signal, integrating the result over several hundred milliseconds, and adjusting the gain of the video signal to maintain the peak level of the video signal constant. The output of AGC and DC restore circuit 123 is scan signal 219. AGC and DC restore circuit 123 is desirable because the scan decoder circuit that is the subject of the invention applies parameters that are related to the black level and peak level of the scan signal. AGC and DC restore circuit 123 establishes and maintains a constant and known black level and peak level to the scan signal despite changes in the output of radiation source 103, the transmissivity of the clear area of the soundtrack, optical magnification differences, the accumulation of dirt on the optics, and other variables. AGC and DC restore circuits are well known in the video art, and so details of the circuit will not be discussed. Other scanning circuits known in the art can be used to produce scan signal 219.

A simplified block diagram of the scan decoder that is the subject of the invention is shown in FIG. 2a. Scan signal 219 is connected to the input of threshold detector 215, which, according to the invention, has a transversely varying threshold level. The output of threshold detector 215, thresholded signal 217, is ideally a series of pairs of rectangular pulses at the scan rate (48.2 kHz in the preferred embodiment); one pulse of each pair corresponds to the output of the left track, and the other pulse of the pair corresponds to the output of the right track. Thresholded signal 217 is fed from threshold detector 215 to audio recovery circuit 221 which recovers from thresholded signal 217 two analog audio signals $L_T$ and $R_T$.

The noise reduction and distortion reduction benefits of a threshold detector with a transversely varying threshold level according to the invention will now be described with the aid of FIGS. 3 and 4 respectively. FIG. 2b is described below. FIG. 2a will be described further below. FIGS. 3 and 4 show, for simplicity, a single scan of, for instance, the right track. The rest of the scan, covering the left track, is omitted for clarity. In FIG. 3, scan signal 219, the input of threshold detector 215, is shown as curve 305, and thresholded signal 217 is shown as curve 306. FIGS. 3a and 3b show the input/output relationship of a threshold detector as is already known in the art having a fixed threshold level represented by curve 307.

FIG. 3a depicts a scan of the soundtrack of a new print having neither severe dirt in the clear area nor severe pinholes or scratches in the opaque area. Scan signal 219 (curve 305) only crosses fixed threshold level 307 at point 309 corresponding to the boundary between the first opaque area and the clear area, and at point 311 corresponding to the boundary between the clear area and the second opaque area. Thresholded signal 217 (curve 306) has only two transitions during the scan, one positive-going (corresponding to an opaque-to-clear boundary in the soundtrack) and one negative-going (corresponding to a clear-to-opaque boundary in the soundtrack). Fluctuations in the amplitude of scan signal 219 in the opaque areas and in the clear area are not sufficiently large to cross fixed threshold 307 in either direction, so do not cause additional transitions in thresholded signal 217 (curve 306), and do not contribute noise to the recovered audio signal.

FIG. 3b depicts a scan of the soundtrack of a print that has been projected a number of times, so that dirt and scratches have accumulated on the film. Instead of scan signal 219 (curve 305) crossing fixed threshold 307 only at points 309 and 311, curve 305 further crosses fixed threshold 307 at points 313 and 315 due to a large pinhole in the first opaque area, and at points 317, 319, 321 and 323 due to a smaller and a larger speck of dirt in the clear area, and at points 325 and 327 due to severe scratch in the second opaque area. Thus, the output of fixed level threshold detector 215 (curve 306) includes several false transitions as well as the two transitions caused by the boundaries of the soundtrack. The additional transitions cause noise in the recovered audio signal.

Figure 3A:
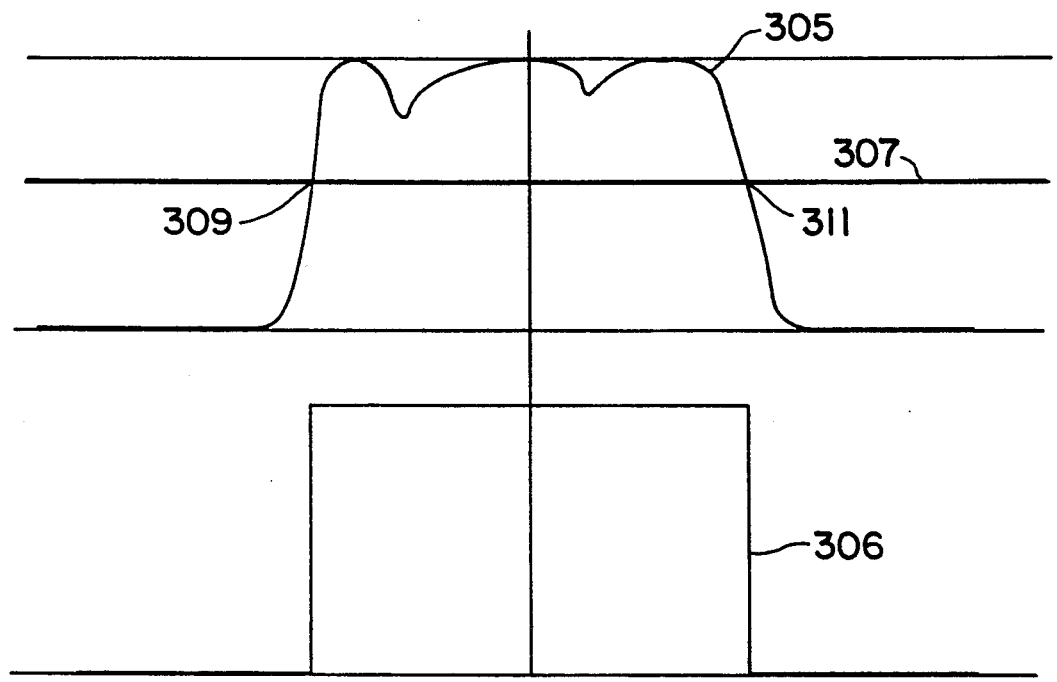
FIGS. 3a and 3b show how known scan signal decoders incorporating a threshold detector with a fixed threshold reduces noise compared with a conventional solar cell reproduction system.
Figure 3B:
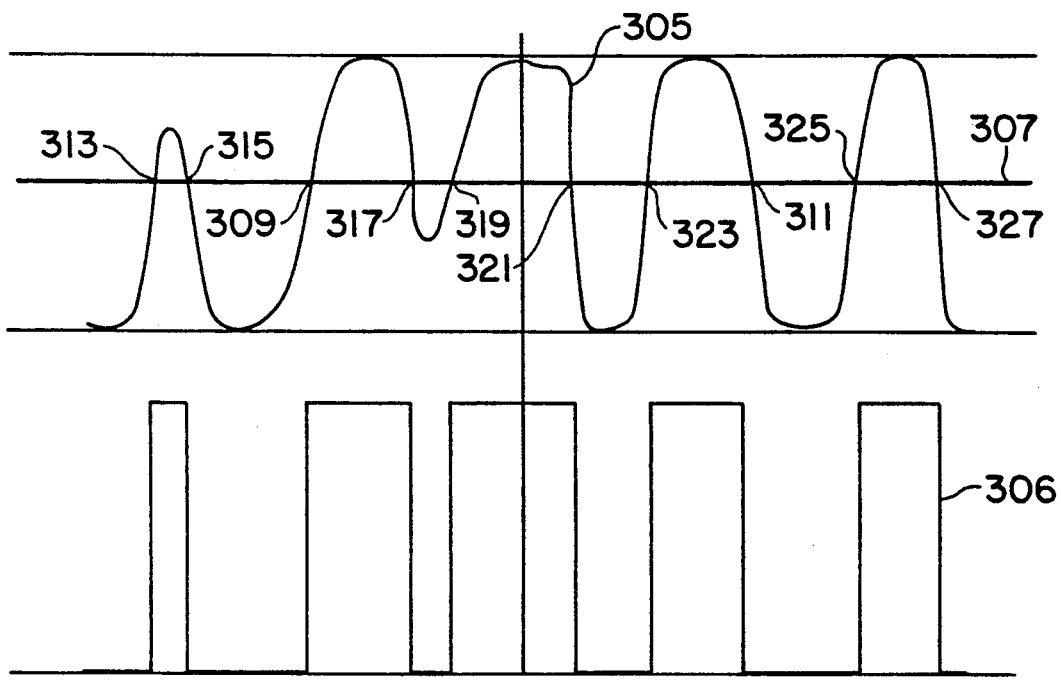
Figure 3C:
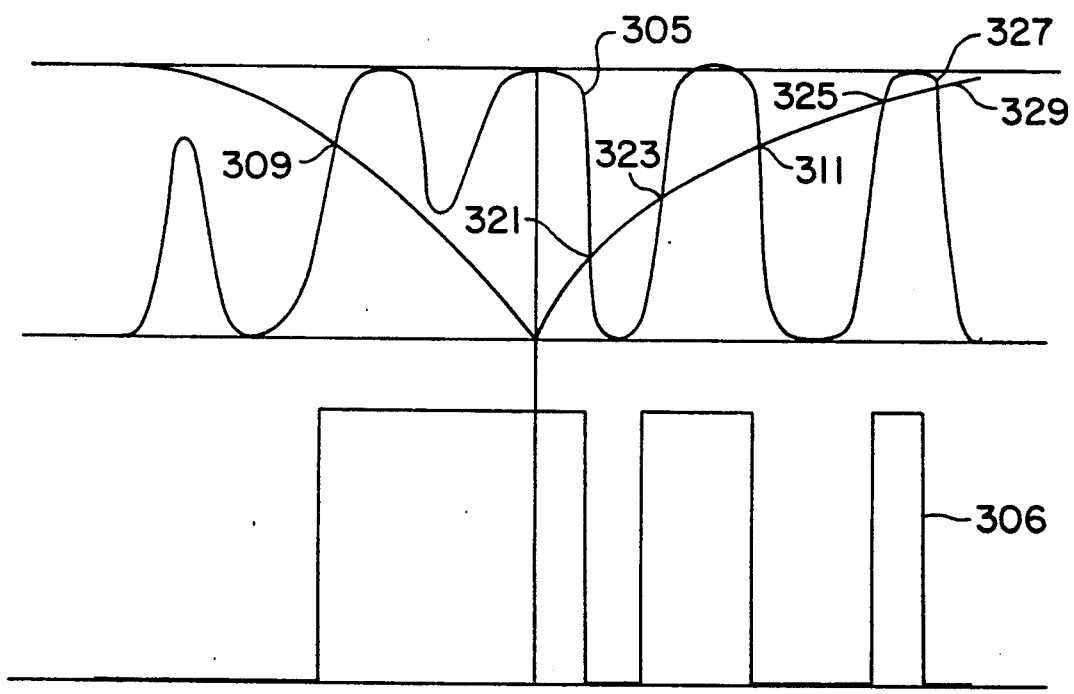
FIG. 3c shows how a scan signal decoder incorporating a threshold detector with a transversely varying threshold according to the invention reduces noise compared with known scan signal decoders and conventional solar cell reproduction systems.

FIG. 3c depicts a scan of the same piece of worn soundtrack as in FIG. 3b in which threshold detector 215 has a transversely varying threshold according to the invention. Curve 329 shows how the threshold level of threshold detector 215 varies across the width of the soundtrack. Scan signal 219 (curve 305) is normally low in the first opaque area, but the large pinhole causes it to increase. Transversely varying threshold level 329 is high in the first opaque area, so although the large pinhole causes scan signal 219 to increase, the scan-signal does not increase far enough to cross threshold 329. Thus, the pinhole does not cause any transitions in thresholded signal 217 (curve 306) and does not contribute noise to the recovered audio signal.

Scan signal 219 (curve 305) is normally high in the clear area, but both specks of dust cause it to decrease. Transversely varying threshold 329 level is low in the clear area, so although the smaller speck of dust causes scan signal 219 to decrease, the scan signal does not decrease far enough to cross threshold 329. Thus, the smaller speck of dust does not cause any transitions in thresholded signal 217 (curve 306) and does not contribute noise to the recovered audio signal.

A transversely varying threshold according to the invention provides a threshold level 329 relative to the normal level of scan signal 219 that, at all points on the scan of the soundtrack, maximizes the change in the normal level of scan signal 219 required to cross the threshold level, and thus minimizes the chance of a transmissivity variation causing a false transition in thresholded signal 217.

A threshold detector with a transversely varying threshold is not a panacea for noise caused by transmissivity variations: large pieces of dirt and severe scratches can still cause changes in the scan signal sufficiently large to cross the threshold and cause false transitions in the output of the threshold detector. In FIG. 3c, the larger speck of dust in the clear area and the severe scratch in the second opaque area cause scan signal 219 to cross threshold 329 at points 321, 323, 325, and 327 respectively, causing corresponding transitions in thresholded signal 217 (curve 306) and contributing noise to the recovered audio signal. Noise caused by such large transmissivity variations is reduced by the audio recovery aspect of the invention described below.

FIG. 4 shows how a threshold detector with a fixed threshold level causes clipping of negative peaks of the waveform recorded on a bilateral optical soundtrack, and how a transversely varying threshold according to the invention substantially reduces the likelihood of such clipping. According to the convention by which an alternating waveform is recorded on an optical soundtrack, positive-going parts of the waveform are represented by an increase in the clear area, whereas negative-going parts of the waveform are represented by a decrease in the clear area. On negative peaks, the width of the clear area is minimal and the clear area is partially opaque because of the gradual boundary between the opaque and clear areas of the soundtrack, and the tendency of opaque areas to grow together across the clear area when the clear area is narrow. FIG. 4a shows a short piece of, for instance, the right track on which the negative half cycle of a waveform is modulated. The figure shows opaque areas 401 and 402, clear area 403, opaque-to-clear boundary 404 and clear-to-opaque boundary 409. The track is scanned at points a, b, and c (these are not consecutive scans). Again, the rest of the scan, covering the left track, is omitted for clarity. FIG. 4b shows scan signal 219 on the three scans of the waveform at points a, b, and c as curves 405a, 405b and 405c. The peak level of scan signal 219 on the scan at point c is small compared with that of the scan at point a.

Figure 4A:
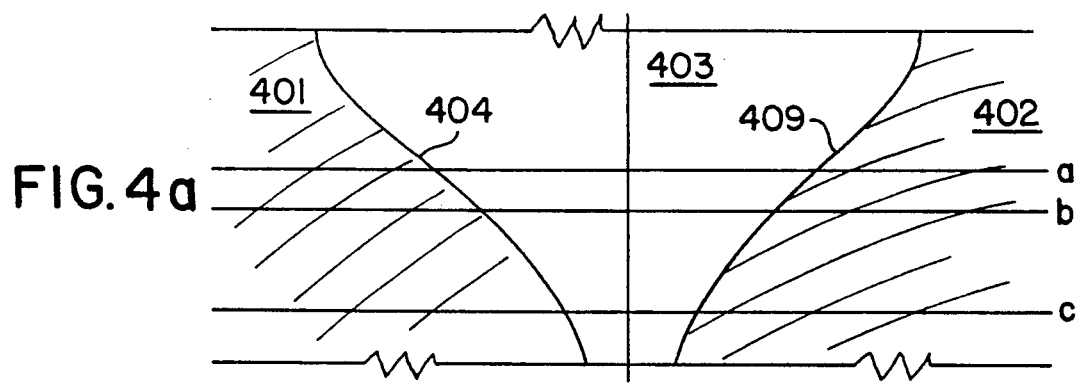
FIGS. 4a through 4c show how a scan signal decoder incorporating a threshold detector with a transversely varying threshold according to the invention reduces clipping distortion on negative peaks compared with known scan signal decoders.
Figure 4B:
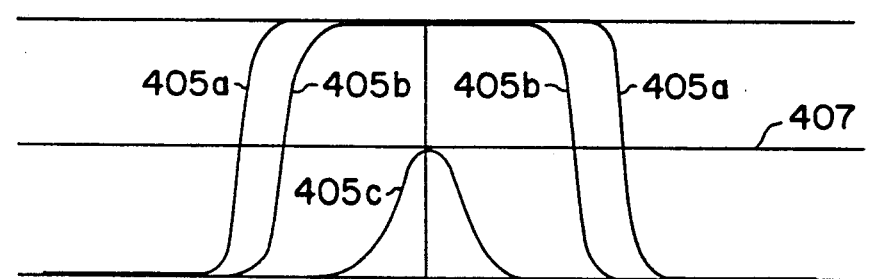

When scan signal 219 is connected to the input of a threshold detector 215 having a fixed threshold level shown in FIG. 4b as curve 407, the peak level of scan signal 219 corresponding to the scan at point c (curve 405c) is insufficient to cross the threshold. Thresholded signal 217, the output of threshold detector 215, changes state during the scans at points a and b (curves 406a and 406b), but the clear area in the scan at point c is not detected, and thresholded signal 217 does not change state during the scan at point c (curve 406c). This results in clipping of the negative peaks of the recovered analog waveform. The amount of clipping depends on the level of the fixed threshold.

Figure 4C:
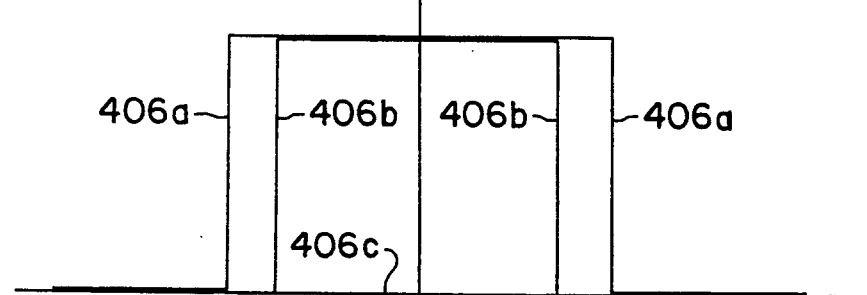
Figure 4C:
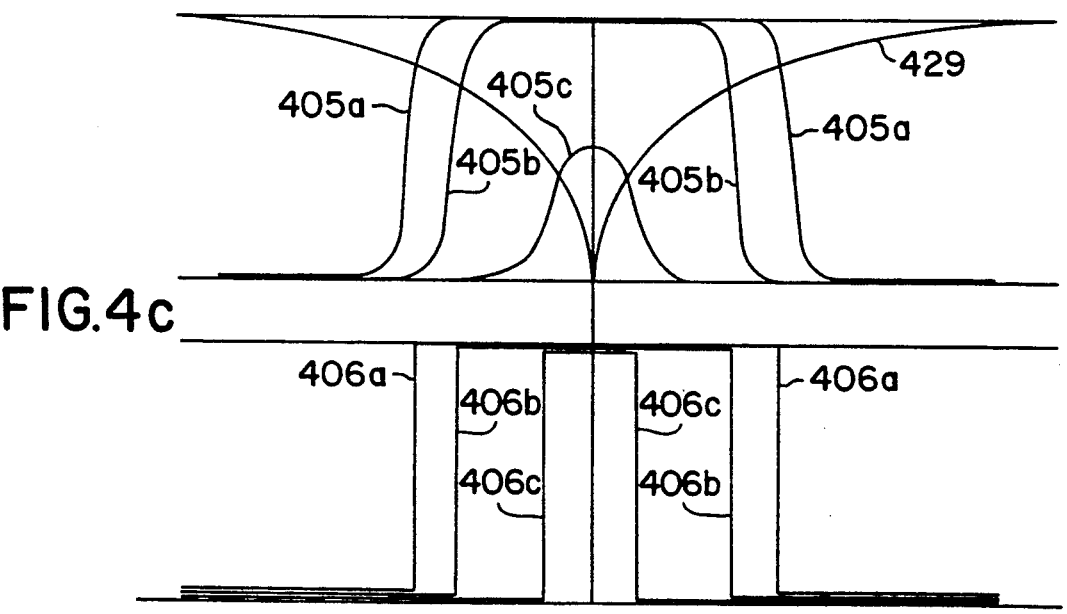

FIG. 4c shows the result of connecting the same three scan signal waveforms 405a, 405b, and 405c to the input of a threshold detector with a transversely varying threshold level according to the invention. The level of the transversely varying threshold (curve 429) is low in the region of the bias line, so that even when the level of the scan signal is reduced because of opacity in the bias line region, as in curve 405c, a clear area is nevertheless detected (curve 406c), and the negative peaks of the recovered analog waveform are not clipped.

Significant reductions of noise and distortion compared with using a fixed threshold level can be obtained with a transversely varying threshold level that varies linearly across each bilinear soundtrack such that the threshold level is between 5% and −5% at the bias line of each soundtrack, and increases linearly and symmetrically to between 80% and 110% at both edges of the soundtrack (100% is the peak level and 0% is the black level of scan signal 219). In the preferred embodiment, the transversely varying threshold level has a maximum level of 100% and a minimum level 0%. The minimum of the transversely varying threshold should coincide exactly with the bias line of the bilateral soundtrack. In an arrangement for scanning a dual bilateral soundtrack, the threshold level changes from high to low to high to low to high as the scan proceeds across the full width of the track; and one minimum of the threshold level should coincide exactly with the bias line of the left track, and the other minimum should coincide exactly with the bias line of the right track.

A further advantage of a threshold detector having a transversely varying threshold level is that it has lower distortion than a threshold detector having a fixed threshold level. At all points on an audio waveform recorded on an optical soundtrack, the transitions detected by a threshold detector having a transversely varying threshold level more accurately represent the instantaneous amplitude of that waveform at the point at which the soundtrack is scanned. Hence, the audio signal derived from such transitions has considerably lower distortion than if the soundtrack were reproduced by a scanning system using a threshold detector having a fixed threshold level, or by an integrating-type sensor such as a solar cell.

A further reduction in distortion can be obtained by using a transversely varying threshold level that has an optimized relationship between threshold level and distance from the bias-line. Since the distortion of an optical soundtrack is both amplitude and frequency dependent, an optimized threshold level versus distance from the bias line relationship has to be a compromise. The linear relationship described above works well, but lower distortion over a wider range of frequencies can be obtained with a parabolic relationship between threshold level and distance from the bias line, with maximum and minimum levels in the ranges stated above. The preferred maximum and minimum levels are about 100% and about 0%, respectively. In the preferred embodiment, the rate of change of threshold level with distance from the bias line near the bias line is about twice that near the edges of the soundtrack. Again, in an arrangement for scanning a dual bilateral soundtrack, the threshold level changes from high to low to high to low to high as the scan proceeds across the full width of the track; and one minimum of the threshold level should coincide exactly with the bias line of the left track, and the other minimum should coincide exactly with the bias line of the right track.

Curves 329 and 429 in FIGS. 3 and 4 respectively show a transversely varying threshold level with a parabolic threshold level to distance from the bias line relationship, and a minimum level coinciding with the bias line.

A threshold detector with a transversely varying threshold level according to a parabolic law also has slightly lower noise than a threshold detector with a transversely varying threshold level according to a linear law because the distance from the edges of the soundtrack at which the threshold level remains high (above 70%, for example) is greater than with the linear law detector. Even some distance from the edges of a soundtrack, the soundtrack is more likely to be opaque than to be clear, so maintaining a high threshold over a greater distance from the edges of the soundtrack provides the most appropriate threshold level to deal with the most common source of transmissivity errors near the edges of the soundtrack, i.e., pinholes and scratches in an opaque area.

A threshold detector with a transversely varying threshold level is obtained by feeding a reference signal that varies with time into the reference input of a video comparator. If a parabolic relationship between threshold level and distance from the bias line is desired, the reference signal must have a parabolic relationship between its level and time before or after the scan passes the bias line (assuming that the scan moves across the width of the soundtrack at a constant speed). In FIG. 2a, threshold detector 215 comprises video comparator 233 and reference generator 231. Integrated circuits that will serve adequately as video comparator 233 are widely available and this aspect of the circuit will not be described in detail. In the preferred embodiment, an LM 361 video comparator, which has two opposite sense outputs is used.

Reference signal 229 from reference generator 231 is fed into the reference input of video comparator 233. Twice on each scan of a dual bilateral soundtrack, reference signal 229 changes progressively from its maximum level to its minimum level and back to its maximum level according to a predetermined law, preferably a parabolic law. The most important parameter of reference signal 229 is that is should reach its minimum value when the scan passes the bias lines of both of the soundtracks. To accommodate normal tolerances in optical sound systems, the minima of reference signal 229 must track the two bias lines together as the film waves, and the distance across the soundtrack between the two minima must be self-adjusting to allow for variations in the magnification of the CCD optical assembly. This saves having to make a precision adjustment of the magnification of the optical assembly on installation. Circuits for generating reference signal 229, and for controlling the generation of reference signal 229 so that it reaches its minimum values when the scan passes the bias lines of both of the soundtracks will be described below.

Figure 2C:
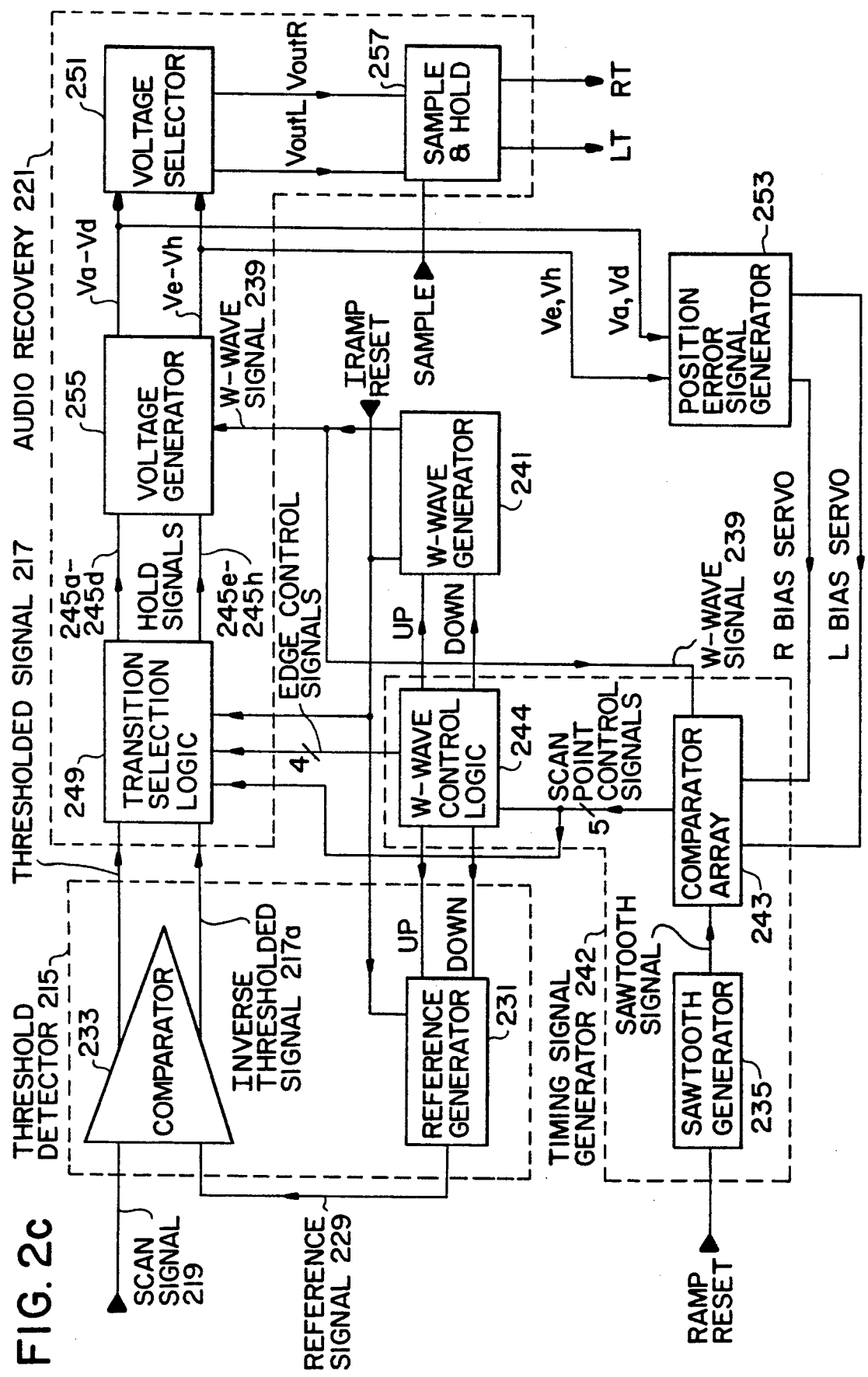
FIG. 2c shows a more detailed block diagram of a scan signal decoder according to the invention.

FIG. 2b shows a simplified version of the scanning system according to the invention, embodying only the threshold detector with the transversely varying threshold aspect of the invention, and using known techniques to recover the analog signals from thresholded signal 217. In this, threshold detector 215 produces two pulses on each scan (ignoring the effect of large transmissivity errors), the width of each pulse corresponding to the widths of the clear areas of the right and left tracks respectively. The pulse pairs would be fed from threshold detector 215 into output selector gate 223, which, under control of the CENTER and RIGHT (or CENTER and LEFT) control signals generated by W-wave control logic 244 (to be described below in connection with FIG. 2c), would gate the pulses alternately into left and right outputs, each of which is a pulse-width modulated signal comprising a series of rectangular pulses at the scan rate. Left total and right total analog audio signals $L_T$ and $R_T$ respectively, would be recovered from the two pulse-width modulated signals by integrating them in low-pass filters 225 and 227 respectively.

A threshold detector with a transversely varying threshold level significantly reduces noise due to transmissivity variations, but is not capable of eliminating such noise altogether. With a defect-free bilateral soundtrack, the output of the threshold detector, thresholded signal 217, has only two transitions per scan, one corresponding to the opaque-to-clear boundary of the soundtrack, the other to the clear-to-opaque boundary of the soundtrack. Transmissivity variations large enough to cause the scan signal to cross the threshold detector threshold cause additional false transitions in the thresholded signal, resulting in noise in the recovered audio signal. The audio recovery aspect of the invention recovers the analog audio signal mainly from the transitions that are due to the soundtrack boundaries, and prevents most other, false, transitions in the thresholded signal from contributing noise to the recovered audio signal.

Audio recovery circuit 221 (FIGS. 2a and 2c) applies the following principles to reject false transitions in thresholded signal 217 caused by large transmissivity errors, to select using a two-stage process at least one transition representing the true width of the clear area of the soundtrack at the point at which it is scanned, and to derive a signal from that at least one transition:

1. the transition caused by the opaque-to-clear soundtrack boundary only occurs before the scan passes the bias line;
2. the transition caused by the clear-to-opaque soundtrack boundary only occurs after the scan has passed the bias line;
3. the opaque area is always further from the bias line than the clear area and vice versa;
4. an accurate representation of the width of the clear area (and hence of the audio signal) can be had by measuring the distance from the bias line to one transition caused by a soundtrack boundary;

5. when there are two transitions on opposite sides of and substantially equidistant from the bias line, an improvement of up to 3 dB in signal-to-noise ratio can be had by recovering the analog audio signal from the average of the distances of the two transitions from the bias line.

Applying these principles, on each scan, a first transition selecting stage, transition selection logic 249, selects the following four transitions from all of the transitions that occur in the output of threshold detector 219 during the scan:

transition (a): the opaque-to-clear transition farthest from the bias line before the scan passes the bias line;
transition (b): the clear-to-opaque transition closest to the bias line after the scan has passed the bias line;
transition (c): the opaque-to-clear transition closest to the bias line before the scan passes the bias line; and
transition (d): the clear-to-opaque transition farthest from the bias line after the scan has passed the bias line.

A second transition selecting stage then selects as the output transition $W_{out}$ having a distance (z) from the bias line, one or more of the four transitions that represent the true width of the clear area of the soundtrack at the point at which it is scanned, and derives an output voltage $V_{out}$ from transition $W_{out}$. The second transition selecting stage selects transition $W_{out}$ according to the following rules:

distance(z) is the lesser of {distance(x)} and {distance (y)} where:
distance (x) is the greater of the distances from the bias line to transition (a) and to transition (b), and
distance (y) is the greater of the distances from the bias line to transition (c) and transition (d).

But if:
distance (x) substantially equals distance (y), then distance (z) is the average of distance (x) and distance (y);
the distances from the bias line to transition (a) and to transition (b) are substantially equal, then distance (x) is the average of the distances from the bias line to the transition (a) and to transition (b);
the distances from the bias line to transition (c) and to transition (d) are substantially equal, distance (y) is the average of the distances from the bias line to the transition (c) and to transition (d).

When a dual bilateral soundtrack is scanned, transitions (a) through (d) are selected with respect to the left track, a first at least one transition $W_{outL}$, representing the width of the clear area of the left track at the point at which it is scanned is selected from them, and a first voltage $V_{outL}$ is derived from the transition $W_{outL}$. A further four transitions, transitions (e), (f), (g), and (h), corresponding to transitions (a), (b), (c) and (d) respectively, are selected with respect to the right track, a second at least one transition $W_{outR}$, representing the width of the clear area of the right track at the point at which it is scanned, is derived from them, and a second voltage $V_{outR}$ is derived from the transition $W_{outR}$.

In most scanning systems, there is a linear relationship between time and distance from the bias line, so audio recovery circuit 221 can be designed to operate in the time domain to implement the above rules and produce a pulse-width modulated signal that, for each soundtrack, produces a single pulse per soundtrack per scan, the width of the pulse being proportional to the width of the clear area of the soundtrack at the point at which it is scanned. On each scan, the following four time differences relating to transitions occurring in thresholded signal 217 would be measured:

(a) the time of the first opaque-to-clear transition and the time the scan passes the bias line ($t_a$);
(b) the time the scan passes the bias line and the time of the first clear-to-opaque transition after the scan passes the bias line ($t_b$);
(c) the time of the last opaque-to-clear transition before the scan passes the bias line and the time the scan passes the bias line ($t_c$); and
(d) the time the scan passes the bias line and the time of the last clear-to-opaque transition after the scan passes the bias line ($t_d$).

An output pulse $t_{out}$ would then be constructed having a duration determined by the four time differences $t_a$ through $t_d$ according to the relationship:

$$t_{out} = \text{the lesser of } t_x \text{ and } t_y$$

where:
$t_x$ is the greater of $t_a$ and $t_b$, and
$t_y$ is the greater of $t_c$ and $t_d$.

But if:
$t_x$ substantially equals $t_y$, $t_{out}$ is the average of $t_x$ and $t_y$;
$t_a$ substantially equals $t_b$, $t_x$ is the average of $t_a$ and $t_b$; and
$t_c$ substantially equals $t_d$, $t_y$ is the average of $t_c$ and $t_d$.

Timing and logic circuits can be devised using principles that are known in the art to perform the operations just described. Alternatively, four pulses can be constructed each with a duration equal to one of the four time differences $t_a$ through $t_d$, and one of them can be selected according to the above relationship to provide the output pulse. The required averaging can be achieved by generating a pulse having a duration equal to the average duration of the pulses to be averaged, and then selecting the generated pulse. The circuit produces a series of pulses at the scan frequency, the pulse width being proportional to the width of the clear area of the soundtrack at the point at which the soundtrack is scanned. The analog audio signal, $L_T$ or $R_T$, is recovered from the pulse-width modulated signal by low-pass filtering as discussed above in connection with FIG. 2b. Transitions from the other bilateral soundtrack can be processed using extra circuitry, or by time multiplexing one set of circuitry between the two tracks.

The preferred embodiment of audio recovery circuit 221 shown in FIG. 2a generates, for each soundtrack, four voltages proportional to the distances of the four transitions from the bias line, and then selects one or more voltages from the set of four voltages to be the output voltage. Generating voltages before the secondary transition selecting stage enables the secondary transition selecting stage to select directly the voltage representative of the width of the clear area of the soundtrack at the point at which it is scanned. Audio recovery circuit 221 for a dual bilateral soundtrack comprises transition selection logic 249, voltage generator 255, voltage selector 251, and sample and hold circuit 257, and recovers the two analog audio signals, $L_T$ and $R_T$.

Transition selection logic circuit 249 performs the primary transition selection and receives thresholded signal 217, EDGE control signals, and SCAN POINT control signals from timing signal generator 242. Transition selection logic circuit 249 generates two groups of four hold signals, hold signals 245a through 245d for the left track and hold signals 245e through 245h for the right track. Hold signals 245a through 245h are all in one state at the beginning of each scan, and change state progressively as the scan proceeds and transitions (a) through (h) respectively occur. The control signals from timing signal generator 242 inform transition selection logic circuit 249 of the position of the scan across the width of the dual bilateral soundtrack so that, for instance, hold signals 245a and 245c, corresponding to transitions (a) and (c) respectively, can only change state when the scan is between the edge and the bias line of the left track.

Voltage generator 255 receives the two groups of four hold signals 245a through 245h and W-wave signal 239 and generates two groups of four analog voltages, voltages $V_a$ through $V_d$ for the left track and voltages $V_e$ through $V_h$ for the right track. Each of the eight outputs of voltage generator 255 follows W-wave signal 239 until the respective hold signal 245a through 245h changes state, after which it remains constant at the level of the W-wave signal at the instant that the hold signal changed state. Hold signals 245b, 245d, 245f, and 245h, which correspond to last transitions, may later in the scan, after they have changed state once, change back to their original state (indicating that the transition previously detected was not the last transition), causing the corresponding output of voltage generator 255 to resume following W-wave signal 239 until the hold signal once more changes state. At the end of the scan, all eight outputs of voltage generator 255 should be constant. Because the level of W-wave signal 239 is proportional to the distance from the bias line (ignoring the slight non-linearity introduced to reduce distortion (to be described below)), at the end of each scan, voltages $V_a$ through $V_d$ are proportional to the distances of the transitions (a) through (d) from the bias line of the left track and voltages $V_e$ through $V_h$ are proportional to the distances of transitions (e) through (h) from the bias line of the right track.

Voltage generator 255 is described in detail below.

The two groups of four analog voltages generated by voltage generator 255 are fed into voltage selector circuit 251 which performs the secondary transition selection in the voltage domain by selecting one of the four voltages $V_a$ through $V_d$ to be the analog output voltage $V_{outL}$ for the left track and selecting one of the four voltages $V_e$ through $V_h$ to be the analog output voltage $V_{outR}$ for the right track according to the following relationships:

For the left track:

$V_{outL}$ is the lesser of $V_x$ and $V_y$ where:
$V_x$ is the greater of $V_a$ and $V_b$,
$V_y$ is the greater of $V_c$ and $V_d$, and
But if:
$V_x$ is substantially equal to $V_y$, $V_{outL}$ is the average of $V_x$ and $V_y$;
$V_a$ is substantially equal to $V_b$, $V_x$ is the average of $V_a$ and $V_b$; and
$V_c$ is substantially equal to $V_d$, $V_y$ is the average of $V_c$ and $V_d$.

For the right track, voltages $V_e$ through $V_h$ are substituted for voltages $V_a$ through $V_d$, and voltage $V_{outR}$ is substituted for $V_{outL}$. The analog output voltage is a direct measure of the width of the clear area of the respective bilateral soundtrack at the point at which the dual bilateral soundtrack is scanned. Voltage selector circuit 251 is described in detail below.

Finally, because voltages $V_a$ through $V_h$, and hence the two analog output voltages $V_{outL}$ and $V_{outR}$ for the left and right tracks respectively, change during the scan and may not reach their final values until the end of the scan, analog output voltages $V_{outL}$ and $V_{outR}$ are fed into sample and hold circuit 257, which generates left and right total analog output signals $L_T$ and $R_T$ respectively. In response to the SAMPLE signal generated by timing signal generator 242, sample and hold circuit 257 updates left and right total analog output signals $L_T$ and $R_T$ with the new values of analog output voltages $V_{outL}$ and $V_{outR}$ respectively at the end of every scan.

The left total and right total analog output signals should be subject to a first sin x/x correction to correct for the scan rate of the scanning system, and a second sin x/x correction to correct for the non-zero height of the pixels of CCD array 115 (FIG. 1). However, since the second correction is considerably greater than the first, a single pixel height slit loss correction (analogous to slit loss correction in conventional systems) will suffice in all but the most critical applications.

In an alternative configuration, voltage generator 255, instead of generating eight voltages $V_a$ through $V_h$ in parallel, generates four voltages $V_a$ through $V_d$ during the first half of the scan, and then uses the same circuitry to generate the other four voltages $V_e$ through $V_h$ during the second half of the scan. This enables the analog circuitry of voltage generator 255 to be simplified, although the complexity of transition selection logic 249 must be increased to multiplex eight parallel hold signals into two sequences of four parallel hold signals. This approach also allows the complexity of voltage selector circuit 251 to be halved; voltage selector 251 selects analog output voltage $V_{outL}$ during the first half of the scan and selects analog output voltage $V_{outR}$ during the second half of the scan. The part of sample and hold 257 generating the left total analog output voltage $L_T$ is clocked at the mid-point of the scan and the part of sample and hold 257 for the right total analog output voltage $R_T$ is clocked at the end of the scan.

In an alternative embodiment, the output of CCD array 115 can be fed into a video digital to analog convertor, the digital output of which is stored in random-access memory. The digital representation of the output of CCD array 115 stored in memory is then processed using a digital signal processing circuit programmed to perform the functions of the analog circuitry described above to recover, after digital to analog conversion, one or more analog output signals. Alternatively, the digital representation of the output of CCD array 115 stored in memory can be examined by means of a computer for transitions according to a transversely varying threshold, and the resulting transitions selected according to a 2-step process as described above to generate representations of the distance of the soundtrack boundaries from the respective bias lines, from which representations one or more analog signals can be computed. One or more analog output signals can then be produced by digital to analog conversion.

The operation of the preferred embodiment will now be described in greater detail. The following description reflects the fact that in the practical embodiment of the invention described, CCD array 115, purely for practical considerations relating the printed circuit layout, scans the right track before the left track.

Timing Signal Generator 242

The generation of various control signals by timing signal generator 242 will now be described with reference to the more detailed block diagram of FIG. 2c and the circuit drawing of FIG. 5. Timing signal generator 242 comprises sawtooth generator 235, comparator array 243 and W-wave control logic circuit 244 and generates the SCAN POINT control signals and the EDGE control signals used by transition selection logic circuit 249, and the UP and DOWN control signals used by reference signal generator 231 and W-wave generator 241.

Sawtooth generator 235 generates a sawtooth signal, the level of which falls linearly from about 6 V to zero during the scan and is rapidly returned to its starting voltage at the end of the scan by the RAMP RESET pulse from scan controller 127 (FIG. 1). The output of sawtooth generator 235 is fed into comparator array 243 which generates the five SCAN POINT control signals RIGHT, RBIAS, CENTER, LBIAS, and LEFT, which change state when the scan passes the edge of the right track, the bias line of the right track, the septum between the tracks, the bias line of the left track, and the edge of the left track respectively. The SCAN POINT control signals and the EDGE control signals, derived from the SCAN POINT control signal by W-wave control logic circuit 244, control transition selection logic circuit 249. W-wave control logic circuit 244 also generates from the EDGE control signals the UP and DOWN control signals that control reference generator 231 and W-wave generator 241.

Figure 5:
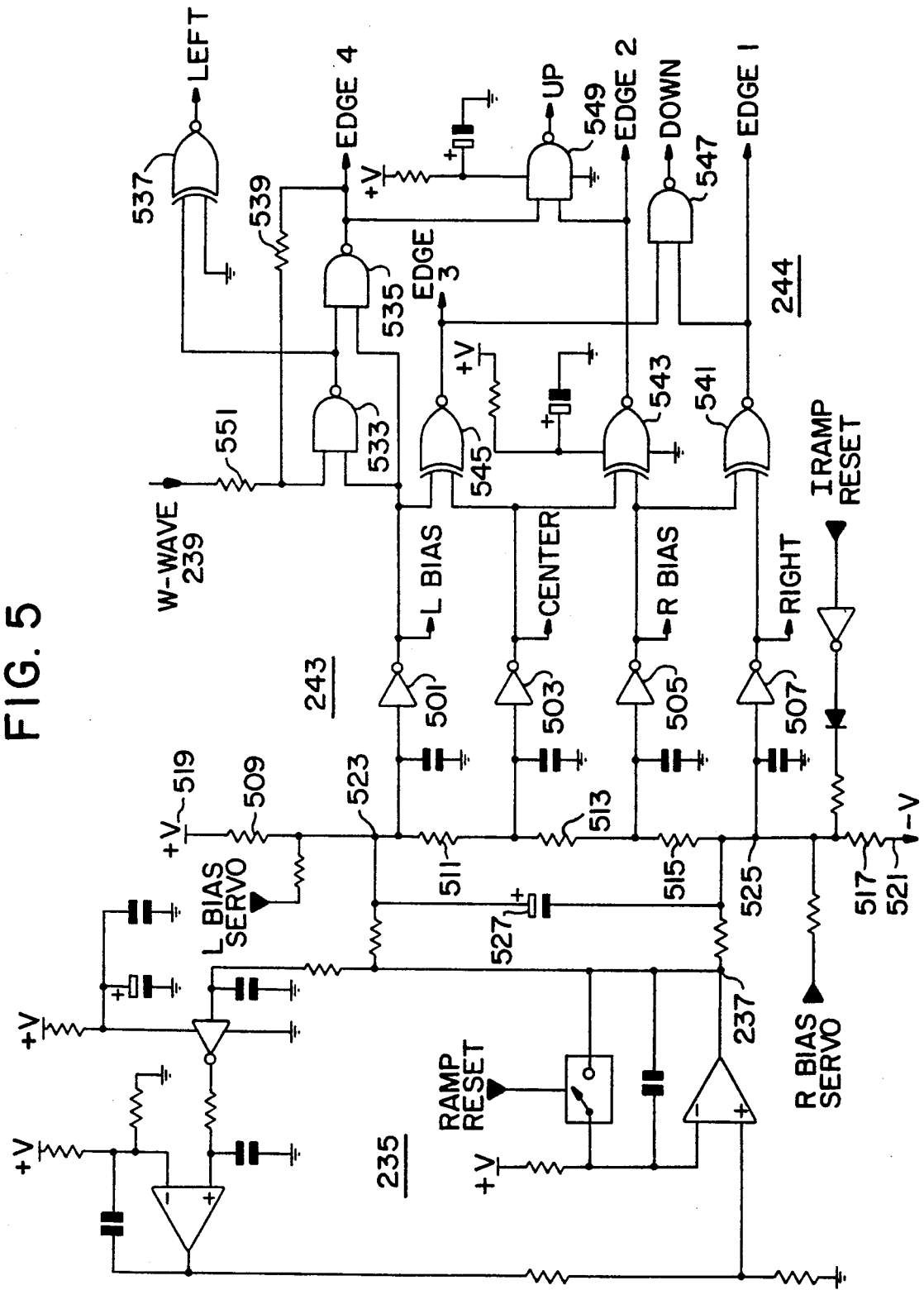
FIG. 5 shows details of the sawtooth ramp generator, timing signal generator and position servos used in connection with generating the transversely varying threshold and the W-wave.

Details of comparator array 243 are shown in FIG. 5. Comparator array 243 comprises four CMOS invertors operating as comparators 501 through 507. The four invertors are part of a hex package; they are on the same chip and thus have well-matched threshold voltages. The inputs of comparators 501 through 507 are connected to a chain of five resistors 509 through 517 connected between positive DC supply 519 and negative DC supply 521. This arrangement causes the input voltages of comparators 501 through 507 to be offset from one another; the values of resistors 509 through 517 are chosen so that the voltage differences between successive pairs of comparator inputs are all equal. The output of sawtooth generator 235 is connected to nodes 523 and 525. Because of the presence of capacitor 527, these nodes are interconnected for rapidly varying signals, but can only vary relative to one another for slowly varying signals. Thus, the DC input levels of comparators 501 through 507 are progressively offset with respect to one another, but, dynamically, due to capacitor 527, the inputs all have the output waveform of sawtooth generator 235 impressed upon them.

At the start of the scan, when the output of sawtooth generator 235 is high, the outputs of comparators 501 through 507 are all low. As the output of sawtooth generator 235 progressively decreases, the outputs of comparators 507 through 501 progressively go high. The output amplitude of sawtooth generator 235 and the relative DC offsets of the inputs of comparators 501 through 507 are chosen so that the outputs of comparators 501 through 507 change state approximately simultaneously with the scan passing the following points on the dual bilateral soundtrack and provide the following control signals:

| Comparator | Point on Scan of Dual Bilateral Soundtrack | Scan Point Control Signal Provided |
|---|---|---|
| 507 | edge of right track | RIGHT |
| 505 | bias line of right track | RBIAS |
| 503 | septum | CENTER |
| 501 | bias line of left track | LBIAS |

Generation of the LEFT control signal will be described later during the description of W-wave generator 241.

Exact synchronization between the time that the RBIAS control signal goes high and the time the scan passes the bias line of the right track and between the time that the LBIAS control signal goes high and the time the scan passes the bias line of the left track is achieved by the LEFT BIAS SERVO signal and the RIGHT BIAS SERVO signal, generated by position error signal generator 253 which will be described below. The LEFT BIAS SERVO signal is a measure the asymmetry of the transitions caused by the opaque-to-clear boundary and the clear-to-opaque boundary farthest from the bias line of the left track, and the RIGHT BIAS SERVO signals is a measure the asymmetry of the transitions caused by the opaque-to-clear boundary and the clear-to-opaque boundary farthest from the bias line of the right track. The sense of the SERVO signals is such that if the transitions are asymmetrical (indicating that the LBIAS and RBIAS control signals are not going high synchronously with the scan passing the respective bias lines), they introduce appropriate offsets into the inputs of comparators 501 through 507 that change the timing of the LBIAS, CENTER, RBIAS, and RIGHT control signals and correct the asymmetry.

Capacitor 527 allows the offset to the inputs of comparator array 243 to change rapidly if both LEFT and RIGHT BIAS SERVO signals are similar, as they are when the asymmetry errors are due to film weave. Capacitor 527 allows the inputs of comparator array 243 to change slowly with respect to one another if the LEFT and RIGHT BIAS SERVO signals are different from one another, as they are when there is an error in the magnification of the CCD optical assembly, or a systematic positioning error in the film soundtrack. The LEFT and RIGHT BIAS SERVO signals do not change the equality of the voltage differences between the inputs of successive pairs of comparators, however.

The RIGHT, RBIAS, CENTER, LBIAS control signals from the outputs of comparators 501 through 507 are fed into X-NOR gates 541, 543 and 545 which produce the EDGE1, EDGE2 and EDGE3 control signals respectively. A fourth control signal, EDGE4, is taken from the output of NAND gate 535. Control signals EDGE1 through EDGE4 are normally high except as follows:

| Signal | Signal is Low when the Scan is Between | | |
|---|---|---|---|
| EDGE1 | right track edge | and | right track bias line |
| EDGE2 | right track bias line | and | septum |
| EDGE3 | septum | and | left track bias line |
| EDGE4 | left track bias line | and | left track edge |

Thus, on each of the four linear parts of the W-wave 239, one of the EDGE signals is in its low condition.

Signals EDGE1 and EDGE3 are fed into NAND gate 547 which operates as an inverse logic NOR gate. The output of gate 547 provides the DOWN control signal which is low except when either EDGE1 or EDGE3 is low. Signals EDGE2 and EDGE4 are fed into NAND gate 549 which operates as an inverse logic NOR gate. The output of gate 549 provides the UP control signal which is low except when either EDGE2 or EDGE4 is low. The UP and DOWN control signals control the operation of reference generator 231 and W-wave generator 241.

Reference Generator 231 and W-Wave Generator 241

Figure 6:
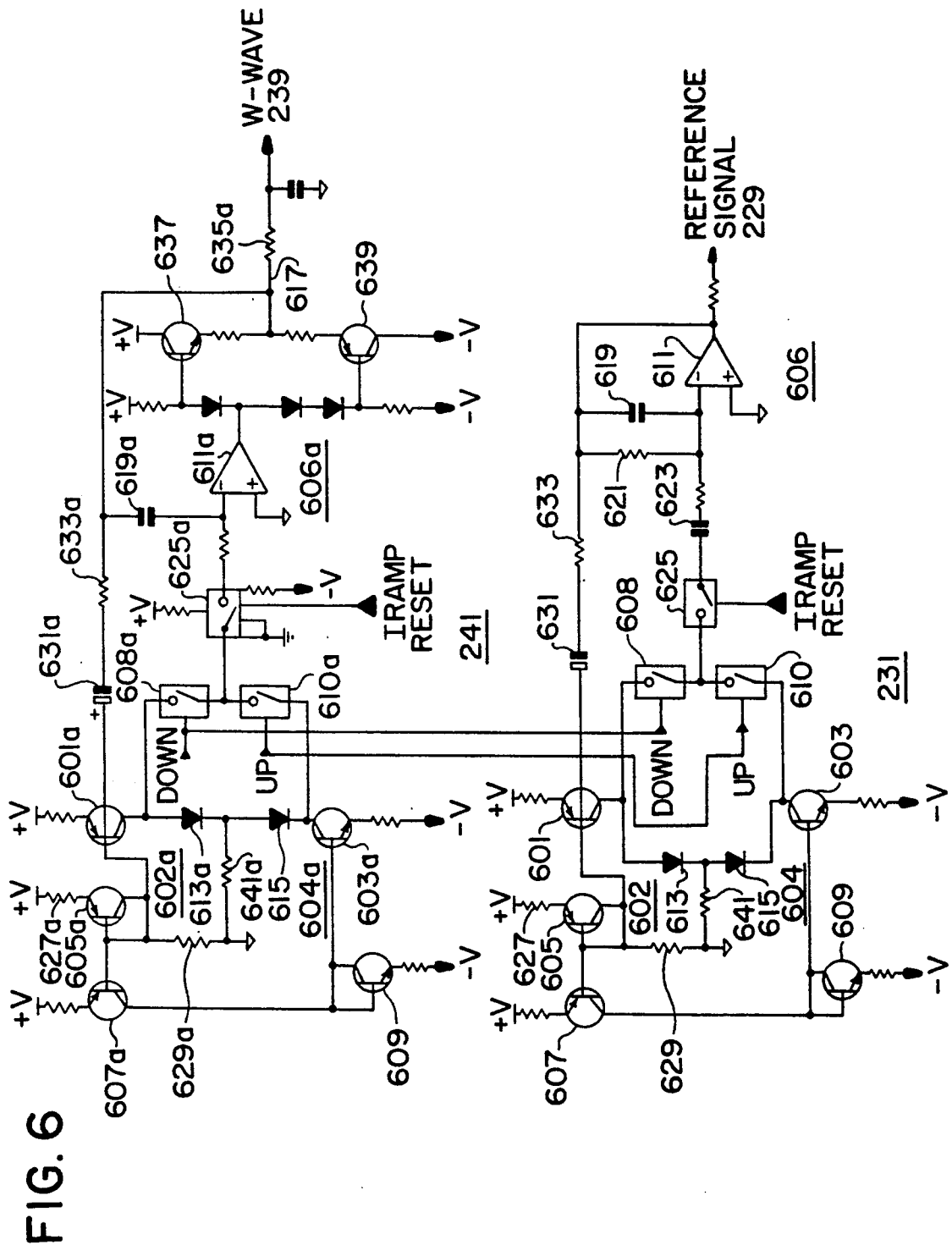
FIG. 6 shows details of the circuits for generating the transversely varying reference level for the threshold detector and the W-wave.

The synchronous generation of reference signal 229 by reference generator 231 and W-wave 239 by W-wave generator 241 will be described with reference to the more detailed block diagram of FIG. 2c and the circuit drawings of FIGS. 6 and 7. Since the two circuits are very similar, reference generator 231 will primarily be described, and differences between reference generator 231 and W-wave generator 241 will be described as they arise. Components in W-wave generator 241 have the same reference numbers as corresponding components in reference generator 231 with a letter "a" added. Reference generator 231 comprises two equal and opposite current generators 602 and 604 feeding integrator 606 through analog switches 608 and 610. Analog switches 608 and 610 are controlled by the UP and DOWN control signals respectively. The output of first current generator 602 is taken from the collector of transistor 601, and the output of second current generator 604 is taken from the collector of transistor 603. A current mirror arrangement, comprising transistors 605, 607, and 609 and their associated passive components, ensures that the currents produced by current generators 602 and 604 are equal and opposite.

Integrator 606 is formed around amplifier 611. Because W-wave generator 241 must be capable of rapidly charging and discharging several capacitors, the current drive capability of amplifier 611a is enhanced by an output stage comprising transistors 637 and 639 and their associated components. For the purposes of analyzing W-wave generator 241, node 617 can be regarded as the output of amplifier 611a. Capacitor 619 between the output and the inverting input of amplifier 611 gives amplifier 611 an integrating characteristic.

In reference generator 231, the outputs of current generators 602 and 604 are a.c. coupled into integrator 606 by coupling capacitor 623 and the DC conditions of integrator 606 are defined by feedback resistor 621, which gives integrator 606 a leaky characteristic. The output waveform distortion resulting from integrator 606 having a leaky characteristic is acceptable in reference generator 231 but cannot be tolerated in W-wave generator 241. Accordingly, in W-wave generator 241, the outputs of current generators 602a and 604a are DC coupled into integrator 606a, and DC conditions are set by a feedback loop from the output of W-wave generator 241 to comparator array 243.

Referring once more to FIG. 5, the output of W-wave generator 241 is connected to one input of CMOS NAND gate 533. The LBIAS control signal, which is connected to the other input of gate 533, holds the output of gate 533 high until the LBIAS control signal goes high, i.e., after the scan passes the bias line of the left track. After the LBIAS control signal goes high, the output of gate 533 can go low when the level of W-wave signal 239, divided by resistors 551 and 539 exceeds the threshold of gate 533. After the scan passes the bias line of the left track, the level of W-wave signal 239 increases from its minimum value until it, divided by resistors 551 and 539, exceeds the threshold of gate 533, which causes the gate to change state and, via gates 535 and 549, switch analog switch 610a OFF. This causes the level of W-wave signal 239 to remain constant, because analog switch 608a is already OFF, until the start of the next scan. Gate 535 and resistor 539 provide positive feedback so that gate 533 rapidly latches into its changed state once it starts to change.

Gate 533 also produces an inverted LEFT control signal; CMOS X-NOR gate 537 inverts the output of gate 533 so that the LEFT control signal has the same sense as the RIGHT control signal.

Returning to FIG. 6, the output of current generator 602, which causes the output voltage of integrator 606 to decrease (integrator 606 is inverting), is connected to the input of integrator 606 via analog switch 608 controlled by the DOWN control signal. When the DOWN control signal is high, the output voltage of integrator 606 decreases. The output of the current generator 604, which causes the output voltage of integrator 606 to increase, is connected to the input of integrator 606 via analog switch 610 controlled by the UP control signal. When the UP control signal is high, the output voltage of integrator 606 increases. When neither the UP nor the DOWN control signal is high, the output voltage of integrator 606 remains constant. When analog switch 608 is open, the output of current generator 602 goes to ground through diode 613 and resistor 641, and when analog switch 610 is open, the output of the current generator 604 comes from ground via diode 615 and resistor 641. Analog switch 625 is switched OFF at the end of each scan by the IRAMP RESET control signal going low. This ensures that no current is fed into integrator 606 as a result of any spurious changes of the UP and DOWN control signals during the reset period.

At the beginning of the scan, neither the UP nor the DOWN control signal is high, and analog switches 608 and 610 are OFF. The output voltage of integrator 606 remains constant at the level reached at the end of the previous scan until the output voltage of sawtooth generator 235 falls to the level at which it causes the RIGHT control signal to change state, which causes the DOWN control signal to change state, and switches analog switch 608 ON. Current generator 602 causes the output voltage of integrator 606 to decrease until the output voltage of sawtooth generator 235 falls to the level at which it causes the RBIAS control signal to change state. This causes both the UP and the DOWN control signals to change state, switching analog switch 608 OFF and analog switch 610 ON. Current generator 604 causes the output voltage of integrator 606 to increase, at the same rate at which it decreased in the previous part of the cycle. The output voltage of integrator 606 reaches a minimum at the point at which the RBIAS control signal changes state, i.e., at the point at which the scan passes the bias line of the right track.

The output of integrator 606 increases until the output of sawtooth generator 235 falls to the level at which it causes the CENTER control signal to change state. This causes both the UP and the DOWN control signals once more to change state, switching analog switch 608 ON and analog switch 610 OFF. Current generator 602 once more causes the output voltage of integrator 606 to decrease until the output of sawtooth generator 235 reaches the level at which it causes the LBIAS control signal to change state. This causes both the UP and the DOWN control signals to change state for a third time, switching analog switch 608 OFF and analog switch 610 ON. Current generator 604 causes the output voltage of integrator 606 to increase once more. The output voltage of integrator 606 once more reaches a minimum, this time when the LBIAS control signal changes state, i.e., at the point at which the scan passes the bias line of the left track.

The output voltage of integrator 606 increases until it, divided by resistors 539 and 551 (FIG. 5), reaches the threshold of the comparator formed by gates 533 and 535 (FIG. 5) changes state (at the point at which the scan passes the edge of the left track), which holds the output voltage of integrator 606 constant for the rest of the cycle of sawtooth generator 235, as described above.

The current output of current generators 602 and 604 is determined by the voltage on the base of transistor 601 (and, via the current mirror comprising transistors 607 and 609, the voltage of the base of transistor 603) which is determined by the positive supply voltage divided by resistors 627 and 629, and by the output of integrator 606, coupled by capacitor 631 and divided by resistor 633 and the parallel combination of resistors 627 and 629. The effect of feeding back the output of integrator 606 via resistor 633 is to increase the output of current generators 602 and 604, and hence the rate of change of the output of integrator 606, as the output of integrator 606 goes more negative. Because the feedback is a.c. coupled, only the instantaneous slope of the output of integrator 606 is changed; its average slope, and hence its symmetry, are unchanged. This gives the output of reference voltage generator 231 its desired parabolic characteristic.

If W-wave generator 241 were required to produce an output waveform that had a pure linear relationship between voltage and distance from the bias lines, it would not include feedback capacitor 631a and resistor 633a. However, increasing the slope of the waveform in the region of the bias line by including feedback resistor 633a, and thereby introducing a deliberate but slight non-linearity into voltage generator 255 (FIG. 2c) reduces distortion caused by the tendency of the opaque areas to grow together in the vicinity of the bias line. The tendency of the opaque areas to grow together moves the opaque-to-clear and clear-to-opaque transitions closer to the bias line than they should be, which results in an insufficient voltage being generated, and causes distortion on negative peaks of the waveform. An appropriate increase in the rate at which the level of W-wave signal 239 changes in the vicinity of the bias line results in the correct voltage being generated, which reduces distortion. In the preferred embodiment, the value of resistor 633a was chosen to increase the slope of W-wave signal 239 near the bias line by about 5% relative to the slope near the edges of the track.

Audio Recovery Circuit 221

The preferred embodiment of audio recovery circuit 221 for recovering the left total audio signal $L_T$ from the left track will now be described. All references to track, bias line, edge, etc. refer to the left track, the bias line of the left track, and the edge of the left track remote from the septum, etc. The audio recovery circuit for recovering the right total audio signal $R_T$ from the right track is identical, except for some differences in transition selection logic circuit 249, which will be described below. In the following description, an opaque-to-clear transition produces a positive-going transition in thresholded signal 217 and a clear-to-opaque transition produces a negative-going transition. Interchanging thresholded signal 217 and inverse thresholded signal 217a (FIG. 2c) will make the circuit work if threshold detector 215 generates opposite-sense transitions.

Audio recovery circuit 221 comprises a primary transition selecting circuit (transition selection logic circuit 249) and a secondary transition selecting circuit (voltage generator 255 and voltage selector 251).

Transition Selection Logic Circuit 249

Transition selection logic circuit 249 will now be described with reference to FIG. 7. On each scan, transition selection logic circuit 249 receives thresholded signal 217, inverse thresholded signal 217a, the four EDGE control signals, the five SCAN POINT control signals, and the IRAMP RESET signal to generate four hold signals 245a through 245d. Each hold signal has two states, TRACK and HOLD. When a hold signal is in its TRACK state, the respective output of voltage generator 255 (which will be described in detail below) follows W-wave signal 239; when a hold signal is in its HOLD state, the respective output of voltage generator 255 remains constant at the level of W-wave signal 239 at the instant that the hold signal changed state.

The hold signals change state synchronously with the following transitions in thresholded signal 217:

245a: the opaque-to-clear transition farthest from the bias line before the scan passes the bias line, 245b: the clear-to-opaque transition closest to the bias line after the scan has passed the bias line, 245c: the opaque-to-clear transition closest to the bias line before the scan passes the bias line, and 245d: the clear-to-opaque transition farthest from the bias line after the scan has passed the bias line.

Hold signal 245a is taken from the $\overline{Q}$ output of D-type bistable circuit 709. At the beginning of the scan, hold signal 245a is in its TRACK (high) state as a result of the IRAMP RESET control signal connected to the RESET input of bistable 709 going low at the end of the previous scan. During the scan, the D input of bistable 709 is held low by the CENTER control signal while the right track is being scanned. Any positive-going transitions in thresholded signal 217, which is connected to the CLOCK input of bistable 709, keep hold signal 245a in its TRACK state. After the scan passes the septum and starts scanning the left track, the CENTER control signal, and hence the D input of bistable 709, go high. Then, the first positive-going transition in the output of threshold detector 215 clocks the $\overline{Q}$ output of bistable 709 low state, and hence hold signal 245a into its HOLD state.

The EDGE4 control signal is connected to the SET input of bistable 709. When the scan reaches the left bias line, the EDGE4 control signal goes low, maintaining hold signal 245a in its HOLD state for the rest of the scan. If, due to overmodulation (clipping) of the soundtrack, or for some other reason, the scan reaches the bias line without there being a positive-going transition in thresholded signal 217, and hold signal 245a is still in its TRACK state, the EDGE4 control signal changing state when the scan passes the bias line drives hold signal 245a into its HOLD state.

Hold signal 245b is taken from the $\overline{Q}$ output of bistable 713. Bistable 713 operates in a similar manner to bistable 709, with the following three exceptions: (a)

inverse thresholded signal 217a is connected to the CLOCK input of bistable 713, so that a clear-to-opaque boundary produces the positive-going clock edge required by bistable 713; (b) the LBIAS control signal, which is high only after the scan passes the bias line, is connected to the D input; and (c) the LEFT control signal, which goes high when scan reaches the edge of the track, is connected through gate 715 acting as an invertor to the SET input of bistable 713. If the scan reaches the edge of the track without there being a negative-going transition in inverse thresholded signal 217a, and hold signal 245b is still in its TRACK state, the LEFT control signal changing state when the scan reaches the edge of the track drives hold signal 245b into its HOLD state.

Hold signal 245c is taken from the output of 2-input NOR gate 711. The EDGE3 control signal connected to one of the inputs of gate 711 keeps hold signal 247c in its HOLD state except when the scan is between the septum and the bias line. When the scan is between the septum and the bias line, hold signal 247c is the inverse of thresholded signal 217. A positive-going transition in thresholded signal 217 drives hold signal 245c into its HOLD state. If, subsequently, before the scan reaches the bias line, thresholded signal 217 goes low once more, this switches hold signal 245c back into its TRACK state. Another positive-going transition in thresholded signal 217 returns hold signal 245c to its HOLD state. If the scan reaches the bias line without there being another positive-going transition in thresholded signal 217, hold signal 245c is switched into its HOLD state by the EDGE3 control signal going high when the scan passes the bias line.

Hold signal 245d is taken from the output of 2-input NOR gate 719. The EDGE4 control signal is connected to one of the inputs of gate 717, thresholded signal 217 is connected to the other. The output of gate 717 is connected to one of the inputs of 2-input NOR gate 719, and the LEFT control signal, which remains low until the scan passes the edge of the track, is connected to the other. The EDGE4 control signal keeps hold signal 245d in TRACK, until the scan reaches the bias line. Then, the EDGE4 control signal goes low, and the output of gate 717 becomes the inverse of thresholded signal 217. Hold signal 245d, the output of gate 719, is the inverse of the output of gate 717, i.e., is the same as thresholded signal 217. Thus, a negative-going transition in thresholded signal 217 (corresponding to a clear-to-opaque boundary) drives the output of gate 717 high, the output of gate 717 low, and hold signal 245 into its HOLD state.

If, subsequently, before the scan reaches the left edge, thresholded signal 217 goes high once more, corresponding to an opaque-to-clear boundary, hold signal 245d reverts to its TRACK state. Another negative-going transition in thresholded signal 217 returns hold signal 245d to its HOLD state. If the scan reaches the bias line without there being another negative transition in thresholded signal 217, and hold signal is still in its TRACK state, hold signal 245d is switched into its HOLD state by the LEFT control signal going high when the scan passes the edge of the track.

Hold signals 245e through 245h for the right track are generated by circuits that are almost identical to the ones just described. The differences are as follows:

| | |
|---|---|
| Bistable 709: | D input: RIGHT control signal |
| Bistable 713: | SET input: EDGE2 control signal |
| | D input: RBIAS control signal |
| GATE 711: | one input: EDGE1 control signal |
| | other input: thresholded signal 217 (unchanged) |
| Gate 715: | input: CENTER control signal |
| Gate 717: | one input: EDGE 2 control signal |
| | other input: thresholded signal 217 (unchanged) |
| Gate 719: | input: CENTER control signal. |

Voltage Generator 255

Voltage generator 255 receives W-wave signal 239 from W-wave generator 241 and hold signals 245a through 245d. Voltage generator circuit 255 comprises four individual track-and-hold circuits 247a through 247d that generate, on each scan, four analog voltages $V_a$ through $V_d$ respectively by tracking W-wave signal 239 from the beginning of each scan until the respective hold signals 245a through 245d change state. Details of track-and-hold circuits 247a through 247d are shown in FIG. 7. Since all four track-and-hold circuits are identical, only track-and-hold circuit 247a, which generates voltage $V_a$, will be described. In FIG. 7, corresponding components for track-and-hold circuits 247b through 247d are indicated by the letters b through d respectively on their designations.

In track-and-hold circuit 247a, analog switch 703a selectively connects W-wave signal 239 (FIG. 2) to capacitor 705a. The combined impedance of analog switch 703a, buffer resistor 635 (FIG. 6) and the output impedance of integrator 606a are sufficiently low that, when analog switch 703a switched ON, the voltage on capacitor 705a accurately follows W-wave signal 239. The output of track-and-hold circuit 247a is derived from capacitor 705a via buffer amplifier 707a, which preferably has unity gain and has a sufficiently high input impedance that the output voltage of track-and-hold circuit 247a remains constant at least over the 21 μs duration of a scan, when analog switch 703a is switched OFF. When hold signal 245a is its TRACK state, analog switch 703a is switched ON, track-and-hold 247a is in TRACK mode, and its output voltage accurately follows W-wave signal 239; when hold signal 245a is in its HOLD state, analog switch 703a is switched OFF, track-and-hold 247a is in HOLD mode, and its output voltage remains constant at the level of W-wave signal 239 at the instant that hold signal 245a switched into its HOLD state.

To generate voltage $V_a$ hold signal 245a switches track-and-hold 247a into TRACK at the beginning of the scan, and switches it to HOLD mode at the point on the scan at which the first (i.e., farthest from the bias line) positive-going transition occurs in thresholded signal 217. If, due to overmodulation (clipping) of the soundtrack, or for some other reason, the scan reaches the bias line without there being a positive-going transition in the output of threshold detector 215, and track-and-hold 247a is still in TRACK, voltage $V_a$ is set to the minimum value of W-wave signal 239 by hold signal 245a changing to its HOLD state when the scan passes the bias line.

Track-and-hold 247b, which generates voltage $V_b$, operates similarly to track-and-hold 245a, except it switches into HOLD mode at the point on the scan after the scan has passed the bias line at which the first (i.e., closest to the bias line) positive-going transition occurs in inverse thresholded signal 217a. If the scan reaches the edge of the track without there being a positive-going transition in the inverse thresholded signal 217a, and track-and-hold 247b is still in its TRACK mode, $V_b$ is set to the level of W-wave signal 239 corresponding to the edge of the track (i.e., a high level) by hold signal 245b changing into its HOLD state when the scan passes the edge of the track.

Hold signal 245c switches track-and-hold 247c, which generates voltage $V_c$, into its TRACK mode when the scan reaches the septum. When the scan is between the septum and the bias line, hold signal 247c is the inverse of thresholded signal 217. Thus, a positive-going transition in thresholded signal 217 drives hold signal 245c into its HOLD state, and switches track-and-hold 247c into its HOLD mode. If, subsequently, before the scan reaches the bias line, thresholded signal 217 goes high once more, switching hold signal 245c into its TRACK state and track-and-hold 247c into its TRACK mode, the output of track-and-hold 247c changes very rapidly to catch up with the current level of W-wave signal 239. Another negative-going transition in thresholded signal 217 returns track-and-hold 247c to its HOLD mode. If the scan reaches the bias line without there being another negative-going transition in thresholded signal 217, $V_c$ is set to the minimum value of the W-wave by hold signal 245c changing into its HOLD state when the scan passes the bias line.

Hold signal 245d switches track-and-hold 247d, which generates voltage $V_d$, into its TRACK mode at the beginning of the scan, where it remains until the scan passes the bias line. Then, hold signal 245d becomes the same as threshold signal 217. Thus, a negative-going transition in threshold signal 217 (corresponding to a clear-to-opaque boundary) drives hold signal 245 into its HOLD state, switching track-and-hold 247d to HOLD.

If, subsequently, before the scan reaches the edge of the track, thresholded signal 217 goes high once more, corresponding to an opaque-to-clear boundary, track-and-hold 247d reverts to its TRACK mode, and the output voltage of track-and-hold 247d changes very rapidly to catch up with the current level of W-wave signal 239. Another negative-going transition in thresholded signal 217 returns track-and-hold 247d to its HOLD mode. If the scan reaches the edge of the track without there being another negative-going transition in thresholded signal 217, $V_d$ is set to the level of W-wave signal 239 at the edge of the track (i.e., a high value) by hold signal 245d changing into its HOLD state when the scan passes the edge of the track.

Voltage Selector Circuit 251—Principles of Operation

Figure 8:
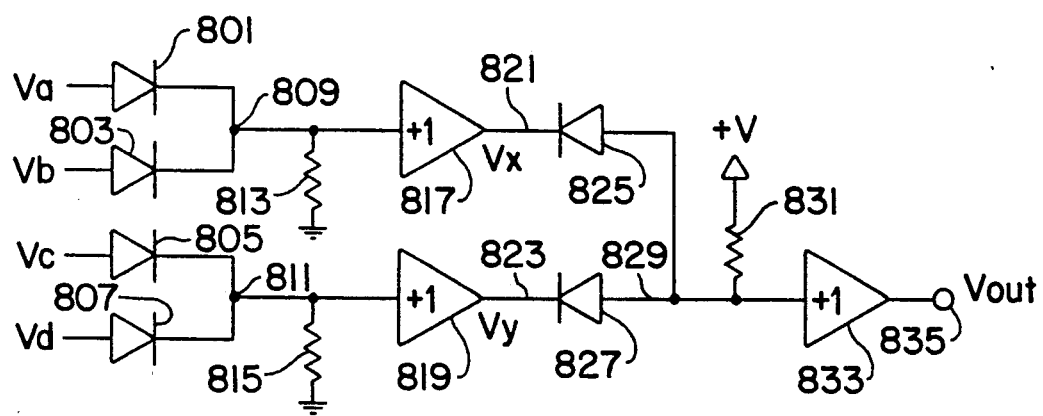
FIG. 8 is a schematic representation of the voltage selector circuit used in the secondary transition selection stage.

FIG. 8 is a schematic representation of the part of voltage selector circuit 251 for selecting the analog output voltage $V_{out}$ from the four voltages $V_a$ through $V_d$ according to the relationships stated above. The other part of voltage selector circuit 251 for selecting analog output voltage $V_{outR}$ from the four voltages $V_e$ through $V_h$ is identical and will not be described. Voltage $V_a$ is connected to diode means 801 and voltage $V_b$ is connected to diode means 803. Voltage $V_c$ is connected to diode means 805 and voltage $V_d$ is connected to diode means 807. Small-signal silicon diodes are preferably used for diode means 801, 803, 805, and 807. To simplify the following analysis, the forward voltage drop of such diodes will be ignored.

The cathode of diode means 801 is connected to the cathode of diode means 803 at node 809; also connected to node 809 is resistor 813, the other end of which is connected to the negative supply voltage, and the input of buffer amplifier 817. The current through resistor 813 forward biases at least one of diode means 801 and 803. Diode means 801 and 803 and resistor 813 form a diode gate in which, if voltage $V_a$ is greater than voltage $V_b$, diode means 801 is conducting, diode means 803 is reverse biassed, and the voltage at node 809 is the same as voltage $V_a$; if voltage $V_b$ is greater than voltage $V_a$, the voltage at node 809 is the same as voltage $V_b$; and, if voltages $V_a$ and $V_b$ are substantially equal to one another, both diode means 801 and 803 conduct, and the voltage at node 809 is the "average" of voltages $V_a$ and $V_b$. Buffer amplifier preferably has unity gain, in which case the voltage $V_x$ at its output, node 821, is the same as at node 809.

Diode means 805 and 807, resistor 815 and buffer amplifier 819 are interconnected similarly to diode means 801 and 803, resistor 813 and buffer amplifier 817. Diode means 805 and 807 and resistor 815 form a diode gate in which, if voltage $V_c$ is greater than voltage $V_d$, the voltage $V_y$ at node 823, the output of buffer amplifier 819, is the same as voltage $V_c$; if voltage $V_d$ is greater than voltage $V_c$, the voltage at node 823 is the same as voltage $V_d$; and if voltages $V_c$ and $V_d$ are substantially equal, the voltage at node 623 is the "average" of voltages $V_C$ and $V_d$.

Nodes 821 and 823 are connected to node 829 via diode means 825 and 827 respectively. Diode means 825 and 827 are the same as diode means 801 through 807, but are connected in the opposite sense, i.e., their anodes are interconnected. Also connected to node 829 is resistor 831, the other end of which is connected to the positive voltage supply, and the input of buffer amplifier 833. Current flowing through resistor 831 forward biases at least one of diode means 825 and 827. Diode means 825 and 827 and resistor 831 form a diode gate in which, if voltage $V_x$ is less than voltage $V_y$, diode means 825 is conducting, diode means 827 is reverse biassed, and the voltage at node 829 is the same as voltage $V_x$; if voltage $V_y$ is less than voltage $V_x$, the voltage at node 829 is the same as voltage $V_y$; and if voltages $V_x$ and $V_y$ are substantially equal, the voltage at node 629 is the "average" of voltages $V_x$ and $V_y$. Buffer amplifier 833 preferably has unity gain, in which case the voltage $V_{out}$ at the output 835 of buffer amplifier 833 is the same as the voltage at node 829.

The greater than/less than characteristic of voltage selector circuit 251 is modified when respective voltage pairs are substantially equal to enable the circuit to comply with rule 5 above. Substantially equal voltages appear at the inputs of the diode gates of voltage selector 251 (such as the diode gate formed by diodes 801 and 803, and resistor 813) when two transitions, one in each direction, occur symmetrically about the bias line. When such symmetrical transitions occur, (1) it is highly likely that they are caused by the boundaries of the soundtrack, and not by large transmissivity variations, and (2) it is desirable the output voltage be derived from the average of voltages proportional to the distances of both boundaries of the bilateral soundtrack from the bias line, since this reduces boundary-generated noise by up to 3 dB. Using normal silicon diodes that have an exponential forward current-voltage characteristic for the diode means, and forward biassing them, enables both of the input voltages fed into the diode gate to contribute to the output voltage when the input voltages are substantially equal. When the input voltages are equal, they both contribute more or less equally to the output voltage. When one of the input voltages changes relative to the other, the output voltage does not abruptly change to become equal to one of the input voltages. Instead, there is a cross-fade effect, and one input becomes progressively the more dominant contributor to the output voltage as the voltage difference between the inputs increases. In the preferred embodiment, a voltage difference between the inputs of about 20 mV, which is about 1% of the maximum input voltage of any of the diode gates, causes an approximately 6 dB imbalance in the contribution of the two inputs to the output.

Voltage Selector Circuit 251—Examples of Operation

The operation of voltage selector circuit 251 will now be described with reference to the several examples shown in FIG. 9; each example shows thresholded signal 217, the output of threshold detector 215, on one scan of one bilateral soundtrack. Also shown in each of the drawings are the positions 901 and 903 of both edges of the track, the calculated position of the bias line (broken line 905) and the two voltage states of the threshold detector output, high voltage state 907 corresponding to the clear area of the soundtrack, and low voltage state 909 corresponding to the opaque area of the soundtrack. Opaque-to-clear transition 911 and clear-to-opaque transition 913 are caused by the boundaries of the soundtrack; all other transitions are caused by defects as described. In the drawings and the following test, the transitions are designated (a), (b), (c), and (d) according to the naming convention adopted above. "Before" and "after" the bias line refers to the progress of the scan.

Figure 9A:
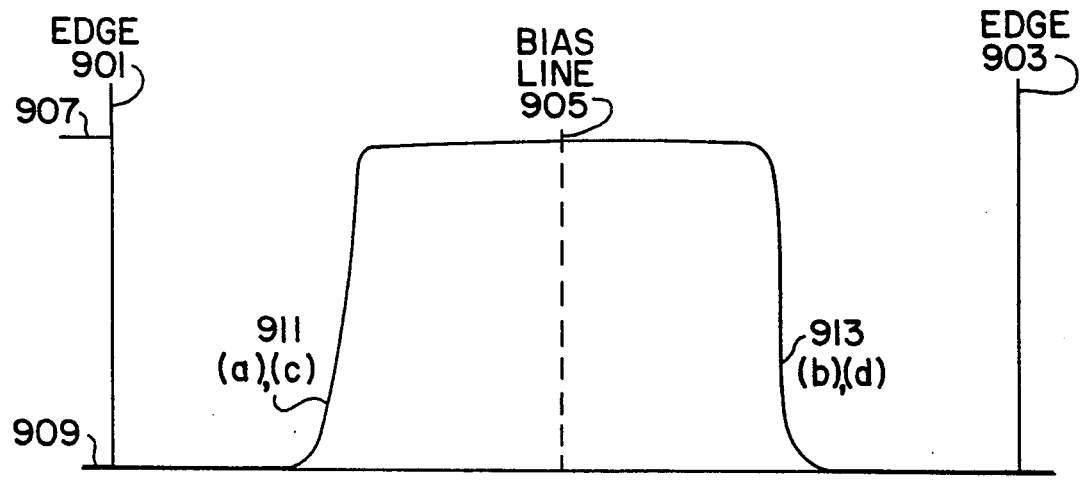

FIG. 9a shows a scan of a soundtrack having neither severe dirt in the clear area nor severe pinholes or scratches in the opaque area. Two transitions 911 and 913 due to the soundtrack boundaries are detected in thresholded signal 217, the output of threshold detector 215:

transition 911 is the opaque-to-clear transition both farthest from (a) closest to (c) the bias line before the scan passes the bias line; and transition 913 is the clear-to-opaque transition both closest to (b) and farthest from (d) the bias line after the scan has passed the bias line.

Voltage generator 255 generates four voltages $V_a$ through $V_d$, all of which are substantially equal. Voltage $V_x$ is the average of voltages $V_a$ and $V_b$, voltage $V_y$ is the average of voltages $V_c$ and $V_d$, and voltage $V_{out}$ is the average of voltages $V_x$ and $V_y$. Both boundaries of the soundtrack contribute to the output voltage.

Figure 9B:
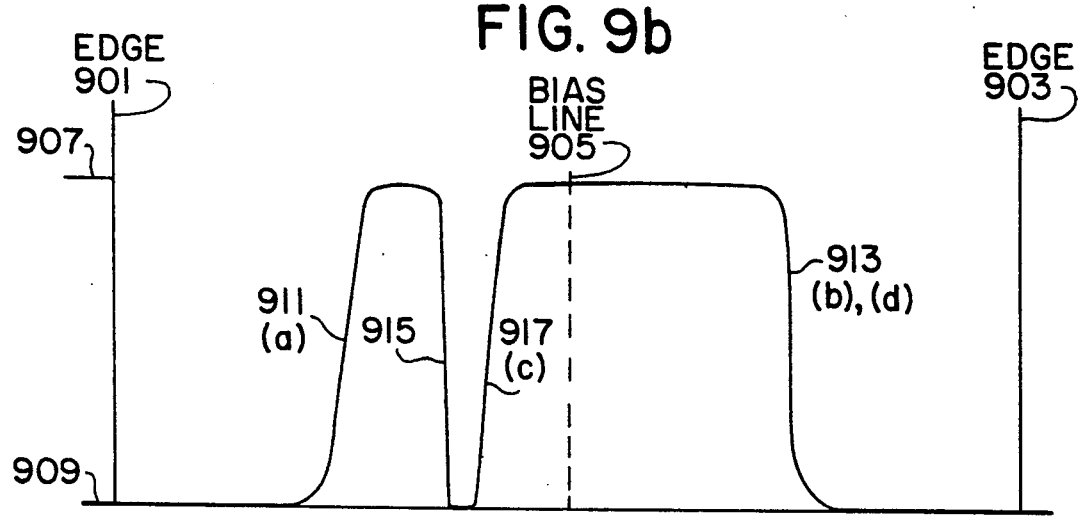

FIG. 9b shows a scan of a soundtrack having a speck of dust in the clear area to the left of the bias line, causing additional transitions 915 and 917. Four transitions are detected in thresholded signal 217:

transition 911 is the opaque-to-clear transition farthest from the bias line before the scan passes the bias line (a);

transition 917 is the opaque-to-clear transition closest to the bias line before the scan passes the bias line (c);

transition 913 is the clear-to-opaque transition both closest to (b) and farthest from (d) the bias line after the scan has passed the bias line; and transition 915 is ignored because it is a clear-to-opaque transition occurring before the scan passes the bias line.

Voltage generator 255 generates three voltages $V_a$, $V_b$, and $V_d$ which are substantially equal, and voltage $V_c$ which is less than the other three. Voltage $V_x$ is the average of voltages $V_a$ and $V_b$; voltage $V_y$ is equal to voltage $V_d$ because $V_d$ is greater than $V_c$. Voltage $V_{out}$ is the average of voltages $V_x$ and $V_y$ because these voltages are substantially equal. Thus, the output voltage $V_{out}$ is derived only from opaque-to-clear transition 911 and from clear-to-opaque transition 913, and not from transitions 915 and 917 caused by dirt. Moreover, both opaque-to-clear transition 911 and clear-to-opaque transition 913 contribute to the output voltage.

A similar analysis and result applies to a speck of dust to the right of the bias line, except that clear-to-opaque transition 915 becomes transition (b) because it now occurs after the scan passes the bias line, and transition 917 is ignored because it is an opaque-to-clear transition occurring after the scan has passed the bias line. Output voltage $V_{out}$ is the average of substantially equal voltages $V_a$, $V_c$, and $V_d$; voltage $V_b$ is discarded because it is smaller than $V_a$.

If the speck of dust were disposed across the bias line, clear-to-opaque transition 915 would be ignored because it occurs before the scan passes the bias line and opaque-to-clear transition 917 would be ignored because it occurs after the scan passes the bias line. Voltage generator 255 would generate four substantially equal voltages, and the analysis and result relating to the defect-free print shown in FIG. 9a would apply.

Figure 9C:
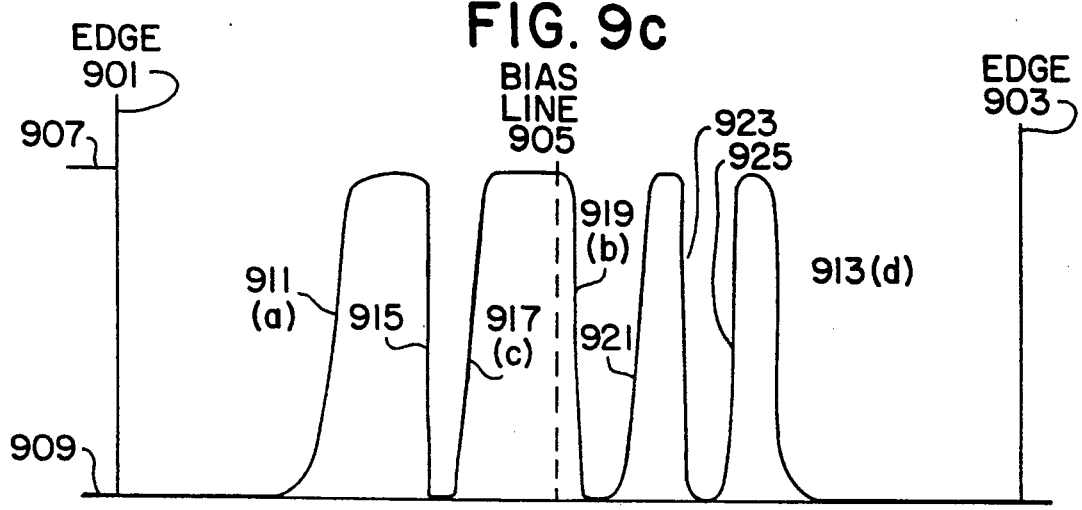

FIG. 9c shows a scan of a soundtrack having several specks of dust in the clear area of the soundtrack causing additional transitions 915, 917, 919, 921, 923, and 925. Eight transitions are detected in thresholded signal 217:

transition 911 is the opaque-to-clear transition farthest from to the bias line before the scan passes the bias line (a);

transition 917 is the opaque-to-clear transition closest to the bias line before the scan passes the bias line (c);

transition 919 is the clear-to-opaque transition closest to the bias line after the scan has passed the bias line (b);

transition 913 is the clear-to-opaque transition farthest from the bias line after the scan has passed the bias line (d);

transition 915 is ignored because it is a clear-to-opaque transition occurring before the scan passes the bias line;

transitions 921 and 925 are ignored because they are opaque-to-clear transitions occurring after the scan has passed the bias line; and transition 923 is ignored because it is neither the closest nor the farthest clear-to-opaque transition after the scan has passed the bias line.

Voltage generator 255 generates two substantially equal voltages $V_a$ and $V_d$, and two voltages $V_b$ and $V_c$ that are less than the other two voltages. Voltage $V_x$ is equal to voltage $V_a$ because $V_a$ is greater than $V_b$; and voltage $V_y$ is equal to voltage $V_d$ (and hence substantially equal to voltage $V_a$) because $V_d$ is greater than $V_c$. Voltage $V_{out}$ is the average of voltages $V_x$ and $V_y$ because these voltages are substantially equal. Again, output voltage $V_{out}$ is derived only from opaque-to-clear transition 911 and from clear-to-opaque transition 913, and not from transitions 915 through 925 caused by dirt. Moreover, both opaque-to-clear transition 911 and clear-to-opaque transition 913 contribute to the output voltage.

FIG. 9d shows a scan of a soundtrack having a pinhole in the opaque area of the soundtrack to the left of the bias line causing transitions 927 and 929. Four transitions are detected in thresholded signal 217:

transition 927 is the opaque-to-clear transition farthest from the bias line before the scan passes the bias line (a);

transition 911 is the opaque-to-clear transition closest to the bias line before the scan passes the bias line (c);

transition 913 is the clear-to-opaque transition closest to (b) and farthest from (d) the bias line after the scan has passed the bias line; and transition 929 is ignored because it is a clear-to-opaque transition occurring before the scan passes the bias line.

Voltage generator 255 generates three substantially equal voltages $V_b$, $V_c$, and $V_d$, and voltage $V_a$ that is greater than the other three voltages. Voltage $V_x$ is equal to voltage $V_a$ because $V_a$ is greater than $V_b$, and voltage $V_y$ is the average of voltages $V_c$ and $V_d$ because these voltages are substantially equal. Voltage $V_{out}$ is equal to voltage $V_y$ because $V_y$ is less than $V_x$. Again, the output voltage $V_{out}$ is derived only from opaque-to-clear transition 911 and from clear-to-opaque transition 913, and not from transitions 927 and 929 caused by the pinhole in the opaque area of the soundtrack. Moreover, both opaque-to-clear transition 911 and clear-to-opaque transition 913 contribute to the output voltage.

A similar analysis and result applies to a pinhole to the right of the bias line, except that transition 911 is the opaque-to-clear transition farthest from (a) and closest to (c) the bias line before the scan passes the bias line, clear-to-opaque transition 929 becomes transition (d) because it occurs after the scan has passed the bias line, and transition 927 is ignored because it is an opaque-to-clear transition occurring after the scan has passed the bias line. Voltage $V_x$ is the average of voltages $V_a$ and $V_b$ because these voltages are substantially equal; voltage $V_y$ is equal to voltage $V_d$ because $V_d$ is greater than $V_c$. Output voltage $V_{out}$ is equal to voltage $V_x$ because $V_x$ is less than $V_y$. Multiple pinholes on the same side of the bias line produce the same results as a single pinhole because voltage generator 255 ignores transitions produced by more than one pinhole.

FIG. 9e shows a soundtrack having a pinhole in the opaque area causing transitions 927 and 929 and several pieces of dirt in the clear area causing transitions 915 through 925. Ten transitions are detected in thresholded signal 217:

transition 927 is the opaque-to-clear transition farthest from the bias line before the scan passes the bias line (a);

transition 921 is the opaque-to-clear transition closest to the bias line before the scan passes the bias line (c);

transition 923 is the clear-to-opaque transition closest to the bias line after the scan has passed the bias line (b);

transition 913 is the clear-to-opaque transition farthest from the bias line after the scan has passed the bias line (d);

transitions 929, 915, and 919 are ignored because they are clear-to-opaque transitions occurring before the scan passes the bias line;

transitions 911 and 917 are ignored because they are neither the farthest nor the closest opaque-to-clear transitions occurring before the scan passes the bias line; and transition 925 is ignored because it is an opaque-to-clear transition after the scan has passed the bias line.

Voltage generator 255 generates four unequal voltages $V_a$ through $V_d$. Voltage $V_x$ is equal to voltage $V_a$ because $V_a$ is due to a transition caused by a defect in the opaque area whereas $V_b$ is due to a transition caused by a defect in the clear area, which is closer to the bias line than the opaque area; hence $V_a$ is greater than $V_b$. Voltage $V_y$ is equal to voltage $V_d$ because $V_d$ is due to a transition caused by the clear-to-opaque boundary whereas $V_b$ is due to a transition caused by a defect in the clear area, hence $V_d$ is greater than $V_b$. Voltage $V_{out}$ is equal to voltage $V_y$ because $V_y$ is less than $V_x$ ($V_d$ is less than $V_a$ because $V_d$ is due to the clear-to-opaque transition and $V_a$ is due to a defect in the opaque area). Again, the output voltage $V_{out}$ is derived only from clear-to-opaque transition 913, and not from transitions caused by the pinhole or the dirt. A similar analysis and results applies if the pinhole is to the right of the bias line, except that $V_{out}$ is derived from opaque-to-clear transition 911.

FIG. 9f shows a scan of a soundtrack in which the opaque-to-clear boundary region of the soundtrack is contaminated with dirt. Dirt contamination in the boundary region of the soundtrack displaces into the clear area of the soundtrack the point at which threshold detector 215 detects the transition. In the example in FIG. 9f, contamination in the boundary region of the soundtrack displaces the point at which the opaque-to-clear transition is detected from 911 to 911'. Dirt in the boundary regions of the soundtrack is more likely than dirt in the clear area itself to cause errors in thresholded signal 217 because the light reducing effect of the dirt combines with the light reducing effect of the boundary region to displace the point on the scan at which the transition in thresholded signal 217 occurs. Two transitions are detected in thresholded signal 217:

transition 911' is the opaque-to-clear transition both farthest from (a) and closest to (c) the bias line before the scan passes the bias line; and transition 913 is the clear-to-opaque transition both closest to (b) and farthest from (d) the bias line after the scan has passed the bias line.

Voltage generator 255 generates two substantially equal voltages $V_a$ and $V_c$, and two lesser substantially equal voltages $V_b$ and $V_d$. Voltage $V_x$ is the equal to voltage $V_b$, because $V_b$ is greater than $V_a$; voltage $V_y$ is equal to voltage $V_d$ because $V_d$ is greater than $V_c$; and output voltage $V_{out}$ is the average of voltages $V_x$ and $V_y$ because $V_b$ is substantially equal to $V_d$. Thus, output voltage $V_{out}$ is derived from transition 913 caused by the uncontaminated clear-to-opaque boundary, and not from opaque-to-clear transition 911' caused by the contaminated boundary. A similar analysis and result applies if the clear-to-opaque boundary were contaminated instead. Additional dirt in the clear area does not change the result, except that output voltage $V_{out}$ is equal to voltage $V_d$ instead of the average of voltages $V_b$ and $V_d$ if the dirt is to the left of the bias line. Pinholes in the opaque area do not change the result either, with the same exception. If both the opaque-to-clear and clear-to-opaque boundaries are contaminated, audio recovery circuit 221 has to derive output voltage $V_{out}$ from a transition due to a contaminated boundary; however, it will derive output voltage $V_{out}$ from the transition caused by the less severely contaminated, i.e., less erroneous, boundary.

The combination of a pinhole in the opaque area, dirt in the clear area, and a dirt-contaminated soundtrack boundary on the opposite side of the bias line from the pinhole and the dirt defeats the error rejection capabilities of audio recovery circuit 221. A scan of a soundtrack with such defects is shown in FIG. 9g. The pinhole causes transitions 927 and 929; the dirt causes transitions 915, 917, 923 and 925; and the clear-to-opaque boundary is contaminated with dirt, displacing transition 913 to 913'. Eight transitions are detected:

transition 927 is the opaque-to-clear transition farthest from the bias line before the scan passes the bias line (a);

transition 917 is the opaque-to-clear transition closest to the bias line before scan passes before the scan passes the bias line (c);

transition 923 is the clear-to-opaque transition closest to the bias line after the scan has passed the bias line (b);

transition 913' is the clear-to-opaque transition farthest from the bias line after the scan has passed the bias line (d);

transitions 929 and 915 are ignored because they are clear-to-opaque transitions occurring before the scan passes the bias line; and opaque-to-clear transition 911 is ignored because it is neither the farthest nor the closest opaque-to-clear transition before the scan passes the bias line.

Voltage generator 255 generates four unequal voltages $V_a$ through $V_d$. Voltage $V_x$ is equal to voltage $V_a$ because $V_a$ is due to a transition caused by a defect in the opaque area whereas $V_b$ is due to a transition caused by a defect in the clear area, hence $V_a$ is greater than $V_b$. Voltage $V_y$ is equal to voltage $V_d$ because $V_d$ is due to a transition caused by the contaminated clear-to-opaque boundary whereas $V_b$ is due to a transition caused by a defect within the clear area, hence $V_d$ is greater than $V_b$. Output voltage $V_{out}$ is equal to voltage $V_y$ because $V_y$ is less than $V_x$ ($V_d$ is less than $V_a$ because $V_d$ is due to a transition caused by the contaminated clear-to-opaque boundary, whereas $V_a$ is due to a defect in the opaque area. Thus, output voltage $V_{out}$ is derived from transition 913' caused by the contaminated clear-to-opaque boundary instead of from transition 911 caused by the uncontaminated opaque-to-clear boundary. Even so, transition 913' is the only contributor of noise; audio recovery circuit 221 still prevents the pinhole in the opaque area and dirt in the clear area from contributing noise to output voltage $V_{out}$.

The specific combination of defects shown in FIG. 9g (or a mirror image of those defects about the bias line) is required to cause audio recovery circuit 221 to derive its output from the transition caused by the contaminated boundary instead of the transition caused by the uncontaminated boundary. If transition 911 were due to a contaminated boundary instead of transition 913', or if the pinhole were missing or were on the same side of the bias line as the contaminated boundary, or if all clear area dirt were on the same side of the bias line as the contaminated boundary, audio recovery circuit 221 would correctly derive its output from transition 911 due to the uncontaminated boundary.

FIG. 9h shows a scan of a soundtrack having a combination of defects, pinholes on opposite sides of the bias line, that potentially can inflict the most severe defeat to the error rejection capabilities of audio recovery circuit 221. The pinholes cause transitions 927 through 933 in the output of threshold detector 215. Six transitions are detected in thresholded signal 217:

transition 927 is the opaque-to-clear transition farthest from the bias line before the scan passes the bias line (a);

transition 911 is the opaque-to-clear transition closest to the bias line before the scan passes the bias line (c);

transition 913 is the clear-to-opaque transition closest to the bias line after the scan has passed the bias line (b);

transition 933 is the clear-to-opaque transition farthest from the bias line after the scan has passed the bias line (d);

transition 929 is ignored because it is an opaque-to-clear transition occurring before the scan passes the bias line;

transition 931 is ignored because it is an opaque-to-clear transition occurring after the scan has passed the bias line.

Voltage generator 255 generates equal voltages $V_b$ and $V_c$, and voltages $V_a$ and $V_d$ that are greater than the other two voltages. Voltage $V_x$ is equal to voltage $V_a$ because $V_a$ is greater than $V_b$, and voltage $V_y$ is equal to voltage $V_d$ because $V_d$ is greater than $V_c$. Voltage $V_{out}$ is the lesser of $V_x$ and $V_y$, i.e., the lesser of $V_a$ or $V_d$, neither of which is derived from opaque-to-clear transition 911 or clear-to-opaque transition 913. The best that can be said is that output voltage $V_{out}$, though erroneous, is the less erroneous of the two possibilities. In practice, the inability of audio recovery 221 to reject errors due to pinholes occurring on the same scan on both sides of the bias line is not too severe a shortcoming since this type of defect is a relatively rare occurrence. Moreover, the two pinholes must both be large, otherwise at least one of them would be rejected by the transversely varying threshold aspect of the invention.

Voltage Selector Circuit 251—Practical Circuit

Figure 7:
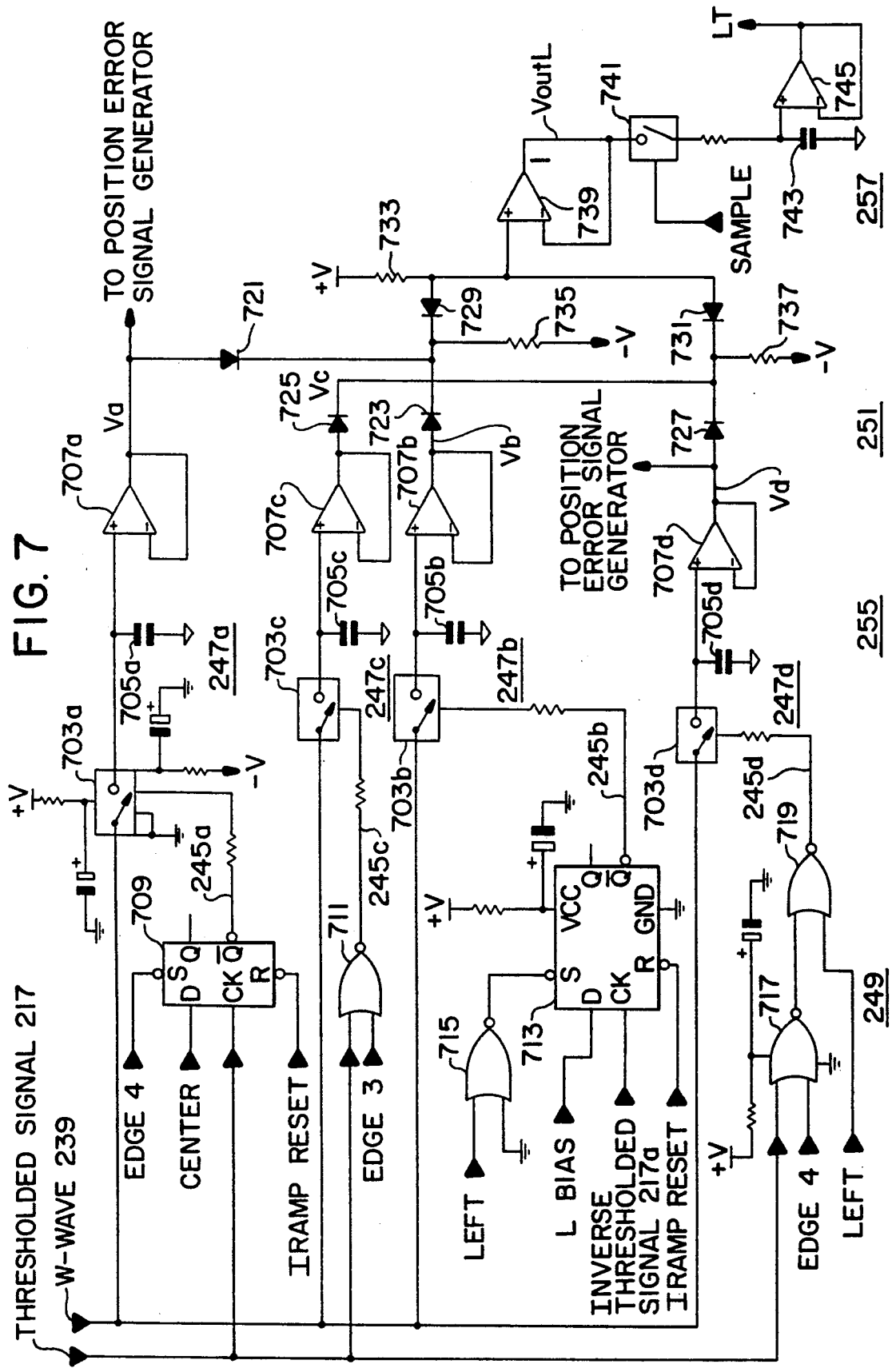
FIG. 7 shows details of the circuits used in the audio recovery aspect of the invention for primary and secondary transition selection.

The practical circuit for voltage selector circuit 251 of the left track is shown in FIG. 7. Buffer amplifiers 817 and 819 (FIG. 8) are not used in the practical circuit: voltages $V_a$ and $V_b$ are derived from the outputs of track-and-holds 247a and 247b respectively and are connected to the anodes of diodes 721 and 723 respectively. Voltages $V_c$ and $V_d$ are derived from the outputs of track-and-holds 247c and 247d respectively and are connected to the anodes of diodes 725 and 727 respectively. The cathode of diode 729 is connected to the cathodes of diodes 721 and 723 and to resistor 735, the other end of which is connected to the negative supply; and the cathode of diode 731 is connected to the cathodes of diodes 725 and 727 and to resistor 737, the other end of which is connected to the negative supply. The anodes of diodes 729 and 731 are connected to one another and to resistor 733, the other end of which is connected to the positive supply.

Resistor 733 feeds about 1.6 mA through diodes 729 and 731; resistors 735 and 737 each draw about 5 mA though diode pairs 721 and 723, and 725 and 727 respectively. The output voltage $V_{out}$ is taken from the output of unity gain buffer amplifier 739, the input of which is connected to the junction of resistor 733 and the anodes of diodes 729 and 731.

Sample and Hold Circuit 257

Output voltage $V_{out}$ changes continuously as the scan progresses and does not reach its final value until the voltages $V_a$ through $V_d$ reach their final values, which may not be until the scan passes the edge of the soundtrack. Accordingly, the output of buffer amplifier 739 is fed into sample and hold circuit 257 which comprises analog switch 741, hold capacitor 743, and buffer amplifier 745. Sample and hold circuit 257 samples in response to the SAMPLE control signal generated by scan controller 127 (FIG. 1). The output of buffer amplifier 745 is the analog output signal $L_T$.

An identical sample and hold circuit is used to derive the analog output signal $R_T$ from the output of voltage selector circuit 251 for the right track.

Position Error Signal Generator 253

Figure 10:
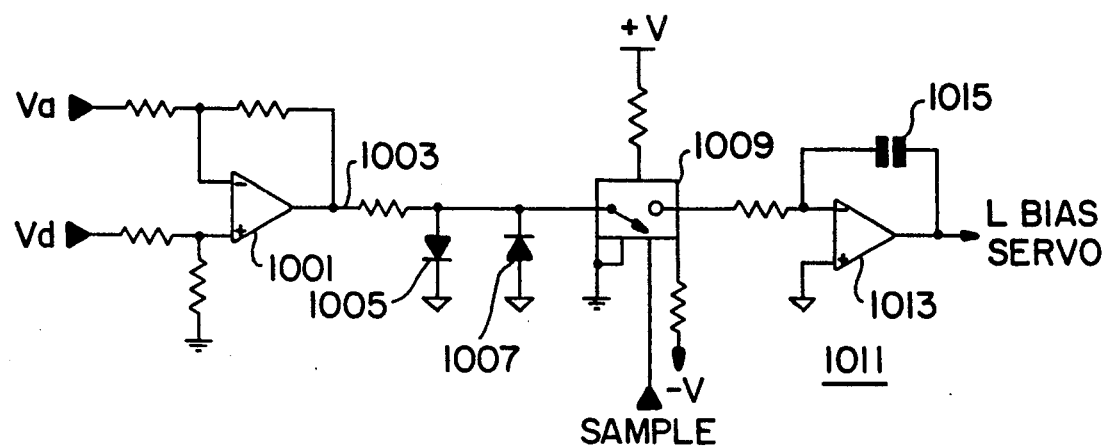
FIG. 10 shows the circuit for generating the left and right bias servo signals used to ensure that the first and second minima of the transversely varying threshold track the bias lines of the left and right bilateral soundtracks, respectively.
Figure 11:
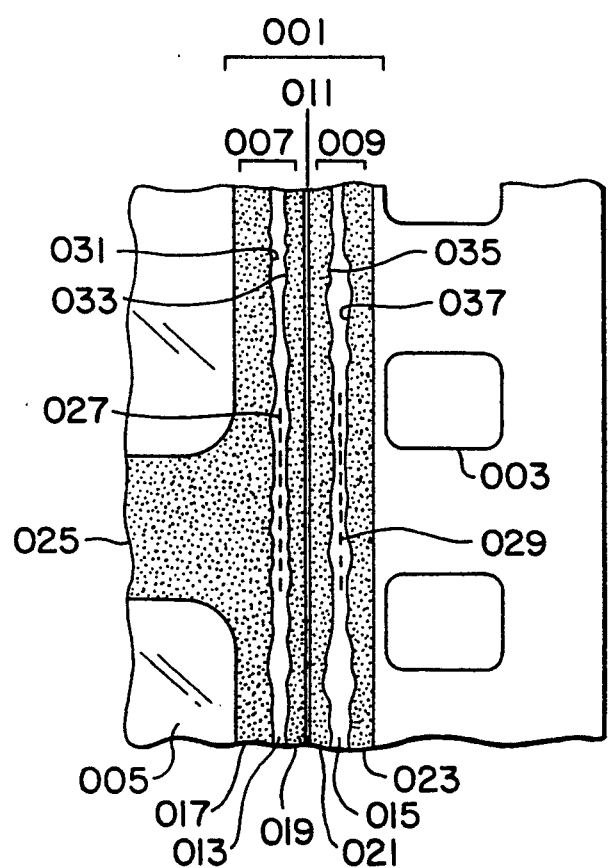
FIG. 11 shows a piece of 35 mm motion picture film having a dual bilateral stereo variable-area optical soundtrack.

FIG. 10 shows position error signal generator 253 for deriving the LEFT and RIGHT BIAS SERVO control signals. To generate the LEFT BIAS SERVO signal, position error signal generator 253 receives voltages $V_a$ and $V_d$ from the outputs of track-and-holds 247a and 247d (FIG. 7) respectively. Amplifier 1001 and its associated components subtracts these voltages, producing a difference signal 1003 at its output. Diodes 1005 and 1007 limit the maximum excursion of difference signal 1003. This prevents large differences between voltages $V_a$ and $V_d$, which differences are almost certainly caused by large transmissivity variations, from causing large disturbances in the LBIAS SERVO control signal.

Error signal 1003 fluctuates considerably as voltages $V_a$ and $V_d$ change during the scan: consequently, analog gate 1009 connects error signal 1003 to the input of integrator 1011 only after the voltages have stabilized at the end of the scan. Analog gate 1009 is controlled by the SAMPLE control signal generated by scan controller 127 (FIG. 1).

Integrator 1011, comprising amplifier 1013, capacitor 1015 and resistor 1017, integrates the sampled error signal with an approximately 380 µs time constant. An identical circuit (not shown), receiving voltages $V_e$ and $V_h$ corresponding to $V_a$ and $V_d$ of the left channel, derives the RIGHT BIAS SERVO control signal. The use of the LEFT BIAS SERVO and RIGHT BIAS SERVO control signals to align the minima of the parabolic reference signal 229 and W-wave signal 239 to the bias lines of the two bilateral soundtracks has already been described.

We claim:

1. A combination for recovering an audio information signal from a scan signal generated by a repetitive scan of a variable-area optical record having record indicia disposed substantially symmetrically about a bias line, wherein the scan is substantially transverse to the bias line, comprising
    threshold detector means for generating a thresholded signal from the scan signal, the threshold detector means having a threshold level that varies as a function of the transverse position of the scan on the optical record, and
    means for recovering the audio information signal from the thresholded signal.

2. The combination of claim 1 wherein the threshold detector means has a threshold level that varies such that it has a minimum value when the scan is at the bias line and an increased level at other points on the scan.

3. The combination of claim 2 wherein there is a linear relationship between the threshold level of the threshold detector means and the distance of the scan from the bias line.

4. The combination of claim 2 wherein there is a parabolic relationship between the threshold level of the threshold detector means and the distance of the scan from the bias line.

5. The combination of claim 4 wherein the slope of the relationship between threshold level and distance from the bias line is about twice near the bias line than near the edge of the optical record.

6. The combination of claims 2, 3, 4, or 5 wherein the threshold level has a minimum value in the range of −5% and +5% and a maximum value in the range of 80% and 110%, where 0% is the black level of the scan signal and 100% is the peak level of the scan signal.

7. The combination of claim 6 wherein the threshold level has a minimum value of about 0% and a maximum value of about 100%.

8. The combination of claims 2, 3, or 4 wherein the threshold detector comprises
    reference generator means receiving a direction control signal from a timing signal generator for generating a reference signal that varies in level according to the transverse position of the scan on the optical record,
    comparator means receiving the scan signal and the reference signal for generating the thresholded signal that has one stable state when the instantaneous level of the scan signal is greater than the instantaneous level of the reference signal, and a second stable state when the instantaneous level of the scan signal is less than the instantaneous level of the reference signal.

9. The combination of claim 8 wherein
    the direction control signal determines whether the level of the reference signal increases or decreases between successive points on the scan, and
    the timing signal generator comprises
        sawtooth generating means for generating a sawtooth signal having a level that is linearly related to the transverse position of the scan,
        a plurality of sawtooth comparator means for generating a scan point control signal that changes state when the transverse position of the scan passes the bias line or an edge of the optical record,
            each sawtooth comparator means receiving the sawtooth signal and a DC offset signal, the DC offset signal being larger for each successive sawtooth comparator means, the DC voltage differences between the inputs of successive pairs of sawtooth comparator means being substantially equal, and
        logic means for deriving the direction control signal from the scan point control signals.

10. The combination of claim 9 wherein each sawtooth comparator means additionally receives a servo signal, and the servo signal changes the points on the sawtooth wave at which the sawtooth comparator means change state, whereby the sawtooth comparator means that changes state at the bias line and the direction control signal change state when the transverse position of the scan is at the bias line.

11. The combination of claim 10 for recovering a first and a second audio information signal from a scan signal generated by a repetitive transverse scan of a dual bilateral variable area optical soundtrack comprising a first track and a second track, each track being bilateral and having a bias line, wherein
    the reference signal has a first minimum level corresponding to the bias line of the first track and a second minimum level corresponding to the bias line of the second track, and
    each sawtooth comparator means receives a first servo signal generated from the first track, and a second servo signal generated from the second track, the first and second servo signals together changing the points on the sawtooth wave at which the sawtooth comparator means change state, whereby the sawtooth comparator means that changes state at the bias line of the first track and the direction control signal change state when the transverse position of the scan is at the bias line of the first track, and the sawtooth comparator means that changes state at the bias line of the second track and the direction control signal change state when the transverse position of the scan is at the bias line of the second track.

12. The combination of claim 11 wherein the first and second servo signals change the input levels of the sawtooth comparator means rapidly when the first and second servo signals are similar to one another, and the first and second servo signals change the input levels of the sawtooth comparator means slowly when the first and second servo signals are different from one another.

13. A combination for recovering an audio information signal from a scan signal generated by a repetitive scan of a bilateral variable area optical soundtrack having a clear area and two opaque areas disposed substantially symmetrically about a bias line, wherein the scan is substantially transverse to the bias line, the soundtrack susceptible to the presence of additional opaque areas in the clear area and additional clear areas in the opaque areas caused by defects, comprising threshold detector means for generating a threshold signal from the scan signal, the threshold signal having, on each scan, at least one opaque-to-clear transition occurring as the transverse position of the scan moves from an opaque area of the soundtrack to a clear area, and at least one clear-to-opaque transition occurring as the transverse position of the scan moves from a clear area of the soundtrack to an opaque area, primary transition selecting means, receiving the thresholded signal, for selecting four transitions from the thresholded signal on each scan:

transition (a), the opaque-to-clear transition farthest from the bias line before the transverse position of the scan passes the bias line, transition (b), the clear-to-opaque transition closest to the bias line after the transverse position of the scan has passed the bias line, transition (c), the opaque-to-clear transition closest to the bias line before the transverse position of the scan passes the bias line, and transition (d), the clear-to-opaque transition farthest from the bias line after the transverse position of the scan has passed the bias line, and secondary transition selecting means, receiving the four transitions selected by the primary transition selection means, for selecting one or more twice-selected transitions from the four transitions, and for recovering the audio information signal from the one or more twice-selected transitions.

14. The combination of claim 13 wherein the secondary transition selecting means comprises transition selecting means for selecting as transition (x) transition (a) or transition (b), the selected transition being the transition that is farther from the bias line, but if transition (a) and transition (b) are substantially equidistant from the bias line, for generating a first average transition having a distance from the bias line substantially equal to the average of the distances of transition (a) and transition (b) from the bias line, and selecting the first average transition as transition (x), transition selecting means for selecting as transition (y) transition (c) or transition (d), the selected transition being the transition that is farther from the bias line, but if transition (c) and transition (d) are substantially equidistant from the bias line, for generating a second average transition having a distance from the bias line substantially equal to the average of the distances of transition (c) and transition (d) from the bias line, and selecting the second average transition as transition (y), transition selecting means for selecting as transition (z) transition (x) or transition (y), the selected transition being the transition that is closer to the bias line, but if transition (x) and transition (y) are substantially equidistant from the bias line, for generating a third average transition having a distance from the bias line substantially equal to the average of the distances of transition (x) and transition (y) from the bias line, and selecting the third average transition as transition (z), and the secondary transition selecting means recovers the audio information signal from transition (z).

15. The combination of claim 14 wherein there is a monotonic relationship between the distance of a transition from the bias line and the difference between the time that the transition occurs and the time that the transverse position of the scan passes the bias line, and the transitions are selected according to the difference between the time that the transition occurs and the time that the transverse position of the scan passes the bias line.

16. The combination of claims 14 or 15 wherein transitions are substantially equidistant from the bias line when the distances of the transitions from the bias line are within about 1% of one another.

17. The combination of claim 13 wherein the primary transition selecting means generates a first, a second, a third, and a fourth hold signal that change state simultaneously with the occurrence of transition (a), transition (b), transition (c), and transition (d), respectively, and the secondary transition selecting means comprises voltage generating means for generating, in response to the first, the second, the third, and the fourth hold signals respectively, four voltages $V_a$, $V_b$, $V_c$, and $V_d$, representative of the distances between transition (a), transition (b), transition (c), and transition (d) respectively and the bias line, and voltage selecting means receiving the four voltages for recovering the audio information signal from the four voltages.

18. The combination of claim 17 wherein the primary transition selecting means additionally receives a first edge control signal that is true before the transverse position of the scan reaches the bias line and a second edge control signal that is true after the transverse position of the scan has passed the bias line, and the voltage generating means comprises W-wave signal generating means, receiving a direction control signal from a timing signal generating means, for generating a W-wave signal having a minimum level when the transverse position of the scan is at the bias line, and a level that increases as the distance of the transverse position of the scan from the bias line increases, a first, a second, a third, and a fourth track-and-hold means for generating the voltages $V_a$, $V_b$, $V_c$, and $V_d$ respectively, each track and hold means receiving the W-wave signal and a respective hold signal, and generating an output voltage substantially equal to the level of the W-wave signal at the instant that the respective hold signal changes state.

19. The combination of claim 18 wherein the direction control signal determines whether the level of the W-wave signal increases or decreases between successive points on the scan, and the timing signal generating means comprises sawtooth generating means for generating a sawtooth signal having a level that is linearly related to the transverse position of the scan, a plurality of sawtooth comparator means for generating a scan point control signal that changes state when the transverse position of the scan passes the bias line or an edge of the soundtrack, each sawtooth comparator means receiving the sawtooth signal and a DC offset signal, the DC offset signal being larger for each successive sawtooth comparator means, the DC voltage difference between the inputs of successive pairs of sawtooth comparator means being substantially equal, and logic means for deriving the direction control signal from the scan point control signals.

20. The combination of claim 19 wherein each sawtooth comparator means additionally receives a servo signal, and the servo signal changes the points on the sawtooth wave at which the sawtooth comparator means change state, whereby the sawtooth comparator means that changes state at the bias line and the direction control signal change state when the transverse position of the scan is at the bias line.

21. The combination of claim 20 for recovering a first and a second audio information signal from a scan signal generated by a repetitive transverse scan of a dual bilateral variable area optical soundtrack comprising a first track and a second track, each track being bilateral and having a bias line, wherein the W-wave signal has a first minimum level corresponding to the bias line of the first track and a second minimum level corresponding to the bias line of the second track, and each sawtooth comparator means receives a first servo signal generated from the first track, and a second servo signal generated from the second track, the first and second servo signals together changing the points on the sawtooth wave at which the sawtooth comparator means change state, whereby the sawtooth comparator means that changes state at the bias line of the first track and the direction control signal change state when the transverse position of the scan is at the bias line of the first track, and the sawtooth comparator means that changes state at the bias line of the second track and the direction control signal change state when the transverse position of the scan is at the bias line of the second track.

22. The combination of claim 21 wherein the first and second servo signals change the input levels of the comparators rapidly when the first and second servo signals are similar to one another, and the first and second servo signals change the input levels of the comparators slowly when the first and second servo signals are different from one another.

23. The combination of claim 17 for recovering a first and a second audio information signal from a scan signal generated by a repetitive transverse scan of a dual bilateral variable area optical soundtrack comprising a first track and a second track, each track being bilateral and having a bias line, wherein the primary transition selecting means is for selecting transition (a), transition (b), transition (c), and transition (d) for the first track and is further for selecting for the second track transition (e), the opaque-to-clear transition farthest from the bias line before the transverse position of the scan passes the bias line, transition (f), the clear-to-opaque transition closest to the bias line after the transverse position of the scan has passed the bias line, transition (g), the opaque-to-clear transition closest to the bias line before the transverse position of the scan passes the bias line, and transition (h), the clear-to-opaque transition farthest from the bias line after the transverse position of the scan has passed the bias line, and additionally generates a fifth, a sixth, a seventh, and an eighth hold signal that change state simultaneously with the occurrence of transition (e), transition (f), transition (g), and transition (h), and the voltage generating means is for generating the four voltages $V_a$, $V_b$, $V_c$, and $V_d$, representative of the distances of transition (a), transition (b), transition (c) and transition (d) respectively from the bias line of the first track, and is additionally for generating, in response to the fifth, the sixth, the seventh, and the eighth hold signals respectively, four voltages $V_e$, $V_f$, $V_g$, and $V_h$, each voltage being representative of the distances of transition (e), transition (f), transition (g), and transition (h) respectively from the bias line of the second track.

24. The combination of claim 23 wherein the voltage selecting means additionally receives the voltages $V_e$, $V_f$, $V_g$, and $V_h$, and comprises means for selecting as voltage $V_{xL}$ the greater of voltage $V_a$ and voltage $V_b$, but if voltage $V_a$ and voltage $V_b$ are substantially equal, for generating a first average voltage substantially equal to the average of voltages $V_a$ and $V_b$, and selecting the first average voltage as voltage $V_{xL}$, means for selecting as voltage $V_{yL}$ the greater of voltage $V_c$ and voltage $V_d$, but if voltage $V_c$ and voltage $V_d$ are substantially equal, for generating a second average voltage substantially equal to the average of voltages $V_c$ and $V_d$, and selecting the second average voltage as voltage $V_{yL}$, means for selecting as voltage $V_{xR}$ the greater of voltage $V_e$ and voltage $V_f$, but if voltage $V_e$ and voltage $V_f$ are substantially equal, for generating a third average voltage substantially equal to the average of voltages $V_e$ and $V_f$, and selecting the third average voltage as voltage $V_{xR}$, means for selecting as voltage $V_{yR}$ the greater of voltage $V_g$ and voltage $V_h$, but if voltage $V_g$ and voltage $V_h$ are substantially equal, for generating a fourth average voltage substantially equal to the average of voltages $V_g$ and $V_h$, and selecting the fourth average voltage as voltage $V_{yR}$, means for selecting as the first audio information signal the lesser of voltage $V_{xL}$ and voltage $V_{yL}$, but if voltage $V_{xL}$ and voltage $V_{yL}$ are substantially equal, for generating a fifth average voltage substantially equal to the average of voltages $V_{xL}$ and $V_{yL}$, and selecting the fifth average voltage as the first audio information signal, means for selecting as the second audio information signal the lesser of voltage $V_{xR}$ and voltage $V_{yR}$, but if voltage $V_{xR}$ and voltage $V_{yR}$ are substantially equal, for generating a sixth average voltage substantially equal to the average of voltages $V_{xR}$ and $V_{yR}$ and selecting the sixth average voltage as the second audio information signal.

25. The combination of claim 24 wherein voltages are substantially equal to one another when they are within about 1% of one another.

26. The combination of claim 17 wherein the voltage selecting means comprises means for selecting as voltage $V_x$ the greater of voltage $V_a$ and voltage $V_b$, but if voltage $V_a$ and voltage $V_b$ are substantially equal, for generating a first average voltage substantially equal to the average of voltages $V_a$ and $V_b$, and selecting the first average voltage as voltage $V_x$, means for selecting as voltage $V_y$ the greater of voltage $V_c$ and voltage $V_d$, but if voltage $V_c$ and voltage $V_d$ are substantially equal, for generating a second average voltage substantially equal to the average of voltages $V_c$ and $V_d$, and selecting the second average voltage as voltage $V_y$, means for selecting as the audio information signal the lesser of voltage $V_x$ and voltage $V_y$, but if voltage $V_x$ and voltage $V_y$ are substantially equal, for generating a third average voltage substantially equal to the average of voltages $V_x$ and $V_y$, and selecting the third average voltage as the first audio information signal.

27. The combination of claim 26 wherein voltages are substantially equal to one another when they are within about 1% of one another.

28. The combination of claim 26 wherein the primary transition selecting means additionally receives a first edge control signal that is true before the transverse position of the scan reaches the bias line and a second edge control signal that is true after the transverse position of the scan has passed the bias line, and the voltage generating means comprises W-wave signal generating means, receiving a direction control signal from a timing signal generating means, for generating a W-wave signal having a minimum level at the bias line and a level that increases as the distance of the transverse position of the scan from the bias line increases, a first, a second, a third, and a fourth track and hold means for generating the voltages $V_a$, $V_b$, $V_c$, and $V_d$ respectively, each track and hold means receiving the W-wave signal and a respective hold signal, and generating an output voltage substantially equal to the level of the W-wave at the instant that the hold signal changes state.

29. The combination of claim 28 wherein the direction control signal determines whether the level of the W-wave signal increases or decreases between successive points on the scan, and the timing signal generating means comprises sawtooth generating means for generating a sawtooth signal having a level that is linearly related to the transverse position of the scan, a plurality of sawtooth comparator means for generating a scan point control signal that changes state when the transverse position of the scan passes the bias line or an edge of the soundtrack, each sawtooth comparator means receiving the sawtooth signal and a DC offset signal, the DC offset signal being larger for each successive sawtooth comparator means, the DC voltage difference between the inputs of successive pairs of sawtooth comparator means being substantially equal, and logic means for deriving the direction control signal from the scan point control signals.

30. The combination of claim 29 wherein each sawtooth comparator means additionally receives a servo signal, and the servo signal changes the points on the sawtooth wave at which the sawtooth comparator means change state, whereby the sawtooth comparator means that changes state at the bias line and the direction control signal change state when the transverse position of the scan is at the bias line.

31. The combination of claim 30 for recovering a first and a second audio information signal from a scan signal generated by a repetitive transverse scan of a dual bilateral variable area optical soundtrack comprising a first track and a second track, each track being bilateral and having a bias line, wherein the W-wave signal has a first minimum level corresponding to the bias line of the first track and a second minimum level corresponding to the bias line of the second track and each sawtooth comparator means receives a first servo signal generated from the first track, and a second servo signal generated from the second track, the first and second servo signals together changing the points on the sawtooth wave at which the sawtooth comparator means change state, whereby the sawtooth comparator means that changes state at the bias line of the first track and the direction control signal change state when the transverse position of the scan is at the bias line of the first track, and the sawtooth comparator means that changes state at the bias line of the second track and the direction control signal change state when the transverse position of the scan is at the bias line of the second track.

32. The combination of claim 31 wherein the first and second servo signals change the input levels of the comparators rapidly when the first and second servo signals are similar to one another, and the first and second servo signals change the input levels of the comparators slowly when the first and second servo signals are different from one another.

33. The combination as in any of claims 17 through 22, or 26 through 30 wherein each of the voltages $V_a$, $V_b$, $V_c$, and $V_d$ has a linear relationship to the distance between the bias line and the transition represented by the voltage.

34. The combination as in any of claims 17 through 22, or 26 through 30 wherein each of the voltages $V_a$, $V_b$, $V_c$, and $V_d$ have a non-linear relationship to the distance between the bias line and the transition represented by the voltage, the voltage increasing with distance between the bias line and the transition represented by the voltage more steeply near the bias line than near the edge of the soundtrack.

35. The combination of claim 34 wherein the slope of the relationship between voltage and distance between the bias line and the transition represented by the voltage is about 5% steeper near the bias line than near the edge of the soundtrack.

36. The combination of claim 34 wherein all of the voltages $V_a$, $V_b$, $V_c$, and $V_d$ have the same non-linear relationship to the distance between the bias line and the transition represented by the voltage.

37. The combination of claims 23, 24, or 25 wherein each of the voltages $V_a$, $V_b$, $V_c$, $V_d$, $V_e$, $V_f$, $V_g$, and $V_h$ has a linear relationship to the distance between the respective bias line and the transition represented by the voltage.

38. The combination of claims 23, 24, or 25 wherein each of the voltages $V_a$, $V_b$, $V_c$, $V_d$, $V_e$, $V_f$, $V_g$, and $V_h$ has a non-linear relationship to the distance between the respective bias line and the transition represented by the voltage, the voltage increasing with distance between the respective bias line and the transition represented by the voltage more steeply near the bias line than near the edge of the respective soundtrack.

39. The combination of claim 38 wherein the slope of the relationship between voltage and distance between the respective bias line and the transition represented by the voltage is about 5% steeper near the bias line than near the edge of the soundtrack.

40. The combination of claim 38 wherein all of voltages $V_a$, $V_b$, $V_c$, $V_d$, $V_e$, $V_f$, $V_g$, and $V_h$ have the same non-linear relationship to the distance between the respective bias line and the transition represented by the voltage.

41. A method for recovering an audio information signal from a scan signal generated by a repetitive scan of a variable-area optical record having record indicia disposed substantially symmetrically about a bias line, wherein the scan is substantially transverse to the bias line, comprising
generating a thresholded signal from the scan signal, the threshold signal generated with reference to a threshold level that varies as a function of the transverse position of the scan on the optical record, and
recovering the audio information signal from the threshold signal.

42. The method of claim 41 wherein the threshold level varies such that it has a minimum value when the scan is at the bias line and an increased level at other points on the scan.

43. The method of claim 42 wherein there is a linear relationship between the threshold level and the distance of the scan from the bias line.

44. The method of claim 42 wherein there is a parabolic relationship between the threshold level and the distance of the scan from the bias line.

45. The method of claim 44 wherein the slope of the relationship between threshold level and distance from the bias line near the bias line is about twice that near the edge of the soundtrack.

46. The method of claims 42, 43, 44, or 45 wherein the threshold signal has a minimum level in the range of −5% and +5% and a maximum level in the range of 80% and 110%, where 0% is the black level of the scan signal and 100% is the peak level of the scan signal.

47. The method of claim 46 wherein the threshold signal has a minimum level of about 0% and a maximum level of about 100%.

48. A method for recovering an audio information signal from a scan signal generated by a repetitive scan of a bilateral variable area optical soundtrack having a clear area and two opaque areas disposed substantially symmetrically about a bias line, wherein the scan is substantially transverse to the bias line, the soundtrack susceptible to the presence of additional opaque areas in the clear area and additional clear areas in the opaque areas caused by defects, comprising
generating a thresholded signal from the scan signal, the thresholded signal having, on each scan, at least one opaque-to-clear transition occurring as the transverse position of the scan moves from an opaque area of the soundtrack to a clear area, and at least one clear-to-opaque transition occurring as the transverse position of the scan moves from a clear area of the soundtrack to an opaque area,
selecting four transitions from the thresholded signal on each scan:
transition (a), the opaque-to-clear transition farthest from the bias line before the transverse position of the scan passes the bias line,
transition (b), the clear-to-opaque transition closest to the bias line after the transverse position of the scan has passed the bias line,
transition (c), the opaque-to-clear transition closest to the bias line before the transverse position of the scan passes the bias line, and
transition (d), the clear-to-opaque transition farthest from the bias line after the transverse position of the scan has passed the bias line,
selecting one or more twice-selected transitions from the four transitions, and
recovering the audio information signal from the one or more twice-selected transitions.

49. The combination of claim 48 wherein
the step of selecting one or more twice-selected transitions from the four transitions comprises
selecting as transition (x) transition (a) or transition (b), the selected transition being the transition that is farther from the bias line, but if transition (a) and transition (b) are substantially equidistant from the bias line, generating a first average transition having a distance from the bias line substantially equal to the average of the distances of transition (a) and transition (b) from the bias line, and selecting the first average transition as transition (x),
selecting as transition (y) transition (c) or transition (d), the selected transition being the transition that is farther from the bias line, but if transition (c) and transition (d) are substantially equidistant from the bias line, generating a second average transition having a distance from the bias line substantially equal to the average of the distances of transition (c) and transition (d) from the bias line, and selecting the second average transition as transition (y), selecting as transition (z) transition (x) or transition (y), the selected transition being the transition that is closer to the bias line, but if transition (x) and transition (y) are substantially equidistant from the bias line, generating a third average transition having a distance from the bias line substantially equal to the average of the distances of transition (x) and transition (y) from the bias line, and selecting the third average transition as the selected transition, and the step of recovering the audio information signal from the twice-selected transitions recovers the audio information signal from transition (z).

50. The method of claim 49 wherein there is a monotonic relationship between the distance of a transition from the bias line and the difference between the time that the transition occurs and the time that the transverse position of the scan passes the bias line, and the transitions are selected according to the difference between the time that the transition occurs and the time that the transverse position of the scan passes the bias line.

51. The method of claims 49 or 50 wherein transitions are substantially equidistant from the bias line when the distances of the transitions from the bias line are within about 1% of one another.

52. The method of claim 48 wherein the step of selecting the four transitions comprises generating a first, a second, a third, and a fourth hold signal that change state simultaneously with the occurrence of transition (a), transition (b), transition (c) and transition (d), respectively, and the step of selecting one or more twice-selected transitions from the four transitions comprises generating, in response to the first, the second, the third, and the fourth hold signals respectively, four voltages $V_a$, $V_b$, $V_c$, and $V_d$, representative of the distances between transition (a), transition (b), transition (c) and transition (d) respectively and the bias line, and recovering the audio information signal from the four voltages.

53. The method of claim 52 wherein the step of recovering the audio information signal from the four voltages comprises selecting as voltage $V_x$ the greater of voltage $V_a$ and voltage $V_b$, but if voltage $V_a$ and voltage $V_b$ are substantially equal, generating a first average voltage substantially equal to the average of voltages $V_a$ and $V_b$, and selecting the first average voltage as voltage $V_x$, selecting as voltage $V_y$ the greater of voltage $V_c$ and $V_d$, but if voltage $V_c$ and voltage $V_d$ are substantially equal, generating a second average voltage substantially equal to the average of the voltages $V_c$ and $V_d$, and selecting the second average voltage as voltage $V_y$, selecting as the audio information signal the lesser of voltages $V_x$ and $V_y$, but if voltage $V_x$ and voltage $V_y$ are substantially equal, generating a third average voltage substantially equal to the average of voltages $V_x$ and $V_y$, and selecting the third average voltage as the audio information signal.

54. The method of claim 53 wherein voltages are substantially equal to one another when they are within about 1% of one another.

* * * * *

UNITED STATES PATENT AND TRADEMARK OFFICE
CERTIFICATE OF CORRECTION

PATENT NO. : 5,237,559
DATED : August 17, 1993
INVENTOR(S) : James B. Murphy, et al.

It is certified that error appears in the above-indentified patent and that said Letters Patent is hereby corrected as shown below:

On the title page item [57],

In the Abstract, line 12, correct "one" to --on--;

Column 15, line 65, "is" (second occurrence) should be --it--; and

Column 16, line 2, "waves" should be --weaves--.

Signed and Sealed this

Third Day of October, 1995

*Attest:*

BRUCE LEHMAN

*Attesting Officer*  *Commissioner of Patents and Trademarks*